(12) United States Patent
Nanaumi

(10) Patent No.: US 8,860,988 B2
(45) Date of Patent: Oct. 14, 2014

(54) PRINT RELAY SYSTEM, PRINT RELAY SYSTEM CONTROL METHOD, AND STORAGE MEDIUM

(75) Inventor: Yoshihito Nanaumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 226 days.

(21) Appl. No.: 13/249,052

(22) Filed: Sep. 29, 2011

(65) Prior Publication Data

US 2012/0120437 A1    May 17, 2012

(30) Foreign Application Priority Data

Nov. 16, 2010    (JP) ................... 2010-256316

(51) Int. Cl.
*G06F 15/00* (2006.01)
*G06F 3/12* (2006.01)

(52) U.S. Cl.
CPC ............ *G06F 3/1288* (2013.01); *G06F 3/1257* (2013.01); *G06F 3/1272* (2013.01); *G06F 3/1247* (2013.01); *G06F 3/1205* (2013.01); *G06F 3/1255* (2013.01)
USPC ........... 358/1.15; 358/1.13; 358/1.1; 358/1.4; 717/174

(58) Field of Classification Search
None
See application file for complete search history.

(56) References Cited

U.S. PATENT DOCUMENTS

| | | | |
|---|---|---|---|
| 2004/0223182 A1 | 11/2004 | Minagawa | |
| 2005/0165979 A1* | 7/2005 | Kato | ............................. 710/15 |
| 2006/0092467 A1* | 5/2006 | Dumitrescu et al. | ......... 358/1.15 |
| 2006/0103869 A1 | 5/2006 | Kato | |
| 2006/0158674 A1* | 7/2006 | Mizoguchi | ................... 358/1.13 |
| 2008/0068641 A1* | 3/2008 | Dance et al. | ................. 358/1.15 |
| 2009/0103128 A1* | 4/2009 | Maeda | ......................... 358/1.15 |
| 2009/0268239 A1* | 10/2009 | Kawara | ....................... 358/1.15 |

FOREIGN PATENT DOCUMENTS

| | | |
|---|---|---|
| CN | 1804782 A | 7/2006 |
| CN | 101551738 A | 10/2009 |
| EP | 1026578 A2 | 8/2000 |
| EP | 1569416 A1 | 8/2005 |
| JP | 2003-216367 A | 7/2003 |
| JP | 2009-266094 A | 11/2009 |
| JP | 4371516 B2 | 11/2009 |

* cited by examiner

*Primary Examiner* — Mark Zimmerman
*Assistant Examiner* — Helen Q Zong
(74) *Attorney, Agent, or Firm* — Canon USA, Inc., IP Division

(57) ABSTRACT

A print relay system capable of executing a communication between a print service system configured to provide a print setting screen to an information terminal operated by a user, to receive a print setting set by the user via the provided print setting screen, and to generate a print job based on the received print setting and stored settings for an image forming apparatus configured to output image data based on the print job includes a receiving unit configured to receive a print job, which is transmitted in a case that a print instruction is input by the information terminal to the print service system, a job updating unit configured to update the print job received by the receiving unit, and a job transmission unit configured to transmit the print job updated by the job updating unit to the image forming apparatus.

11 Claims, 25 Drawing Sheets

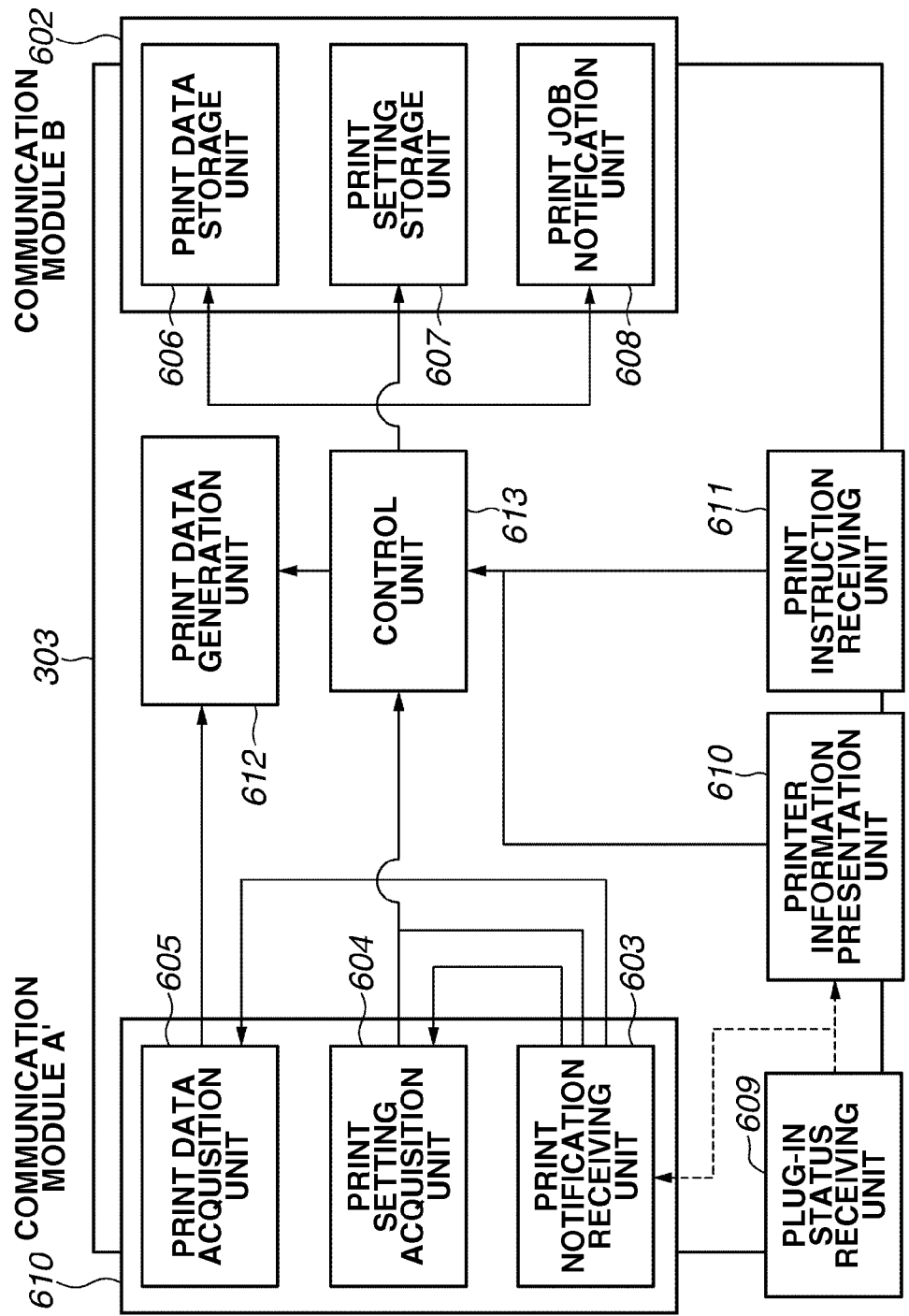

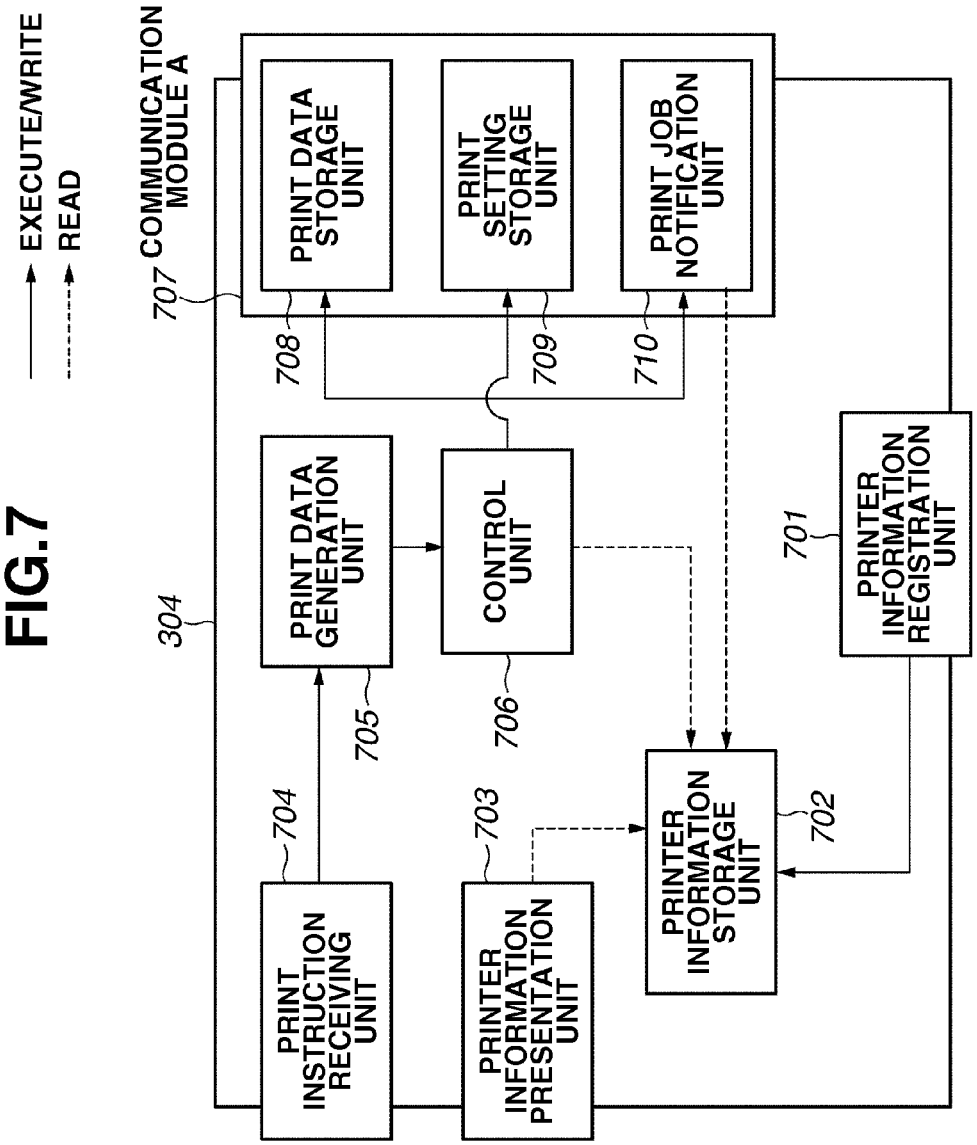

FIG. 8A

| | 801 |
|---|---|
| Service Name | |
| Print Service A | |
| Print Service B | |

FIG. 8B

| virtual printer id | Service Name | real printer id | printer kind | service printer id | name | capabilities | FINISHER | PAPER FEEDING | Billing Code | DETAILED PRINT SETTING |
|---|---|---|---|---|---|---|---|---|---|---|
| | 802 | 803 | 804 | 805 | 806 | 807 | 808 | 809 | 810 | 811 | 812 |
| VP8CH-67YXF-42BBF-2TQ44-9H8XA | Print Service A | MP8CH-67YXF-42BBF-2TQ44-9H8XA | AAA | 3432682791683548017 | Printer 1 | ... | ○ | ○ | ○ | TRUE |
| VP8CH-67YXF-42BBF-2TQ44-9H9XA | Print Service A | MP8CH-67YXF-42BBF-2TQ44-9H9XA | AAB | 3432682791683548018 | Printer 2 | ... | ○ | ○ | × | FALSE |
| VP8CH-67YXF-42BBF-2TQ44-9H10XA | Print Service A | MP8CH-67YXF-42BBF-2TQ44-9H10XA | AAC | 3432682791683548019 | Printer 3 | ... | × | ○ | × | TRUE |
| VP8CH-67YXF-42BBF-2TQ44-9H11XA | Print Service B | MP8CH-67YXF-42BBF-2TQ44-9H11XA | AAD | 3432682791683548020 | Printer 4 | ... | × | ○ | × | TRUE |
| VP8CH-67YXF-42BBF-2TQ44-9H12XA | Print Service B | MP8CH-67YXF-42BBF-2TQ44-9H12XA | AAE | 3432682791683548021 | Printer 5 | ... | × | ○ | × | TRUE |

FIG. 8C

| service printer id | name | VPID | USER NAME | PASSWORD | capabilities |
|---|---|---|---|---|---|
| 813 | 814 | 815 | 816 | 817 | 818 |
| 3432682791683548017 | Printer 1 | VP8CH-67YXF-42BBF-2TQ44-9H8XA | User A | User A | ... |
| 3432682791683548018 | Printer 2 | VP8CH-67YXF-42BBF-2TQ44-9H9XA | User A | User A | ... |
| 3432682791683548019 | Printer 3 | VP8CH-67YXF-42BBF-2TQ44-9H10XA | User A | User A | ... |
| 3432682791683548020 | Printer 4 | VP8CH-67YXF-42BBF-2TQ44-9H11XA | User A | User A | ... |
| 3432682791683548021 | Printer 5 | VP8CH-67YXF-42BBF-2TQ44-9H12XA | User B | User B | ... |

FIG. 8D

| USER NAME | DEVICE UNIQUE SETTING | DEVICE SCREEN |
|---|---|---|
| 819 | 820 | 821 |
| User A | TRUE | TRUE |
| User B | FALSE | FALSE |

FIG. 8E

| | B5 | A4 | Letter |
|---|---|---|---|
| | 822 | 823 | 824 | 825 |
| ONE-SIDED | ○ | ○ | ○ |
| TWO-SIDED | ○ | ○ | × |

FIG.9A

REGISTER TO PRINT SERVICE...

PRINT SERVICE: [▼] ~1001
- Print Service A
- Print Service B

USER ID: [         ] ~1002
PASSWORD: [         ] ~1003

1004 ~ [REGISTER]

WEB BROWSER

WEB BROWSER PLUG-IN [DETAILED PRINT SETTING]

306  PRINT SETTING  2405

TWO-SIDED SETTING: [▼] ~2401
- 1-Side Printing
- 2-Side Printing

COLOR SETTING: [▼] ~2402
- Color
- Mono

PAGE SIZE: [▼] ~2403
- B5
- A4
- A3
- Letter

2404 [REGISTER]

FIG.10A

```
<Capabilities>
  <Duplex>
    <Item>1-Side</Item>
    <Item>2-Side</Item>
  </Duplex>
  <Color>
    <Item>mono</Item>
    <Item>color</Item>
  </Color>
  <PaperSize>
    <Item>B5</Item>
    <Item>A4</Item>
    <Item>A3</Item>
    <Item>letter</Item>
  </PaperSize>
  <Booklet>
    <Item>ON</Item>
    <Item>OFF</Item>
  </Booklet>
  <FileFormat>
    <Item>PDF</Item>
  </FileFormat>
  <BillingCode>
    <Item=RequiredValue/Item>
  </BillingCode>
  <PAPER FEEDING>
    <Item>auto</Item>
    <Item>CASSETTE 1</Item>
    <Item>CASSETTE 2</Item>
  </PAPER FEEDING>
  <finisher>
    <Item>Z-fold</Item>
    <Item>Stateple</Item>
  </finisher>
</Capabilities>
```

FIG.10B

```
<Capabilities>
  <Duplex>
    <Item>1-Side</Item>
    <Item>2-Side</Item>
  </Duplex>
  <Color>
    <Item>mono</Item>
    <Item>color</Item>
  </Color>
  <PaperSize>
    <Item>B5</Item>
    <Item>A4</Item>
    <Item>A3</Item>
    <Item>letter</Item>
  </PaperSize>
</Capabilities>
```

FIG.10C

```
<PrintSettings>
  <Duplex>
    <Item>2-Side</Item>
  </Duplex>
  <Color>
    <Item>mono</Item>
  </Color>
  <PaperSize>
    <Item>letter</Item>
  </PaperSize>
</PrintSettings>
```

FIG.10D

```
<PrintJob>
  <id>
    <Item>58467595613186356 95</Item>
  </id>
  <title>
    <Item>Doc1</Item>
  </title>
  <status>
    <Item>QUEUED</Item>
  </status>                      1001
  <dataUrl>
    <Item>http://prt.srv.com/data/58467595613186 35695</Item>
  </dataUrl>                     1002
  <settingUrl>
    <Item>http://prt.srv.com/setting/8467595613186 35695</Item>
  </settingUrl>
  <PaperSize>
    <Item>letter</Item>
  </PaperSize>
  <Duplex>
    <Item>2-Side</Item>           COMMON SETTING ITEM
  </Duplex>
  <Color>
    <Item>mono</Item>
  </Color>
</PrintJob>
```

FIG.10E

```
<PrintJob>
  <id>
    <Item>5846759561318635695</Item>
  </id>
  <title>
    <Item>Doc1</Item>
  </title>
  <status>
    <Item>QUEUED</Item>
  </status>
  <dataUrl>                              1003
    <Item>http://vprinter.com/data/5846759561318635695</Item>
  </dataUrl>                             1004
  <settingUrl>
    <Item>http://vprinter.com/setting/8467595613186356 95</Item>
  </settingUrl>
  <PaperSize>
    <Item>A4</Item>
  </PaperSize>
  <Duplex>
    <Item>2-Side</Item>            COMMON SETTING ITEM
  </Duplex>
  <Color>
    <Item>mono</Item>
  </Color>
  <BillingCode>
    <Item>1234</Item>              REQUIRED SETTING ITEM
  </BillingCode>
  <finisher>
    <Item>Z-fold</Item>            IMAGE FORMING APPARATUS
  </finisher>                         UNIQUE SETTING ITEM
</PrintJob>
```

FIG.11A

```
"Capabilities": [
  {
    "Duplex": "1-Side",
    "Duplex": "2-Side",
    "Color": "mono",
    "Color": "color",
    "PaperSize": "B5",
    "PaperSize": "A4",
    "PaperSize": "A3",
    "PaperSize": "letter",
    "Booklet": "ON"
    "Booklet": "OFF"
    "BillingCode": "Item=Required Value",
    "PAPER FEEDING": "auto"
    "PAPER FEEDING": "CASSETTE 1"
    "PAPER FEEDING": "CASSETTE 2"
    "finisher": "Z-fold",
    "finisher": "Stateple"
  }
]
```

FIG.11B

```
"Capabilities": [
  {
    "Duplex": "1-Side",
    "Duplex": "2-Side",
    "Color": "mono",
    "Color": "color",
    "PaperSize": "B5",
    "PaperSize": "A4",
    "PaperSize": "A3",
    "PaperSize": "letter"
  }
]
```

FIG.11C

```
"PrintSettings": [
  {
    "Duplex": "2-Side",
    "Color": "color",
    "PaperSize": "letter"
  }
]
```

FIG.11D

```
"jobs": [
{
"id": "58467595613186635695",
"title": "Doc1",
"status": "QUEUED",
"dataUrl": "http://prt.srv.com/data/58467595613186635695",
"settingUrl": "http://prt.srv.com/setting/58467595613186635695"
"PaperSize": "letter",
"Duplex": "2-Side",
"Color": "mono",
}
]
```

FIG.11E

```
"jobs": [
{
"id": "58467595613186635695",
"title": "Doc1",
"status": "QUEUED",
"dataUrl": "http://prt.srv.com/VP8CH67YXF42BBF2TQ449H8XA/data/58467595613186635695",
"settingUrl": "http://prt.srv.com/VP8CH67YXF42BBF2TQ449H8XA/setting/58467595613186635695"
"PaperSize": "A4",
"Duplex": "2-Side",
"Color": "mono",
"BillingCode": "1234",
"finisher": "Z-fold",
}
]
```

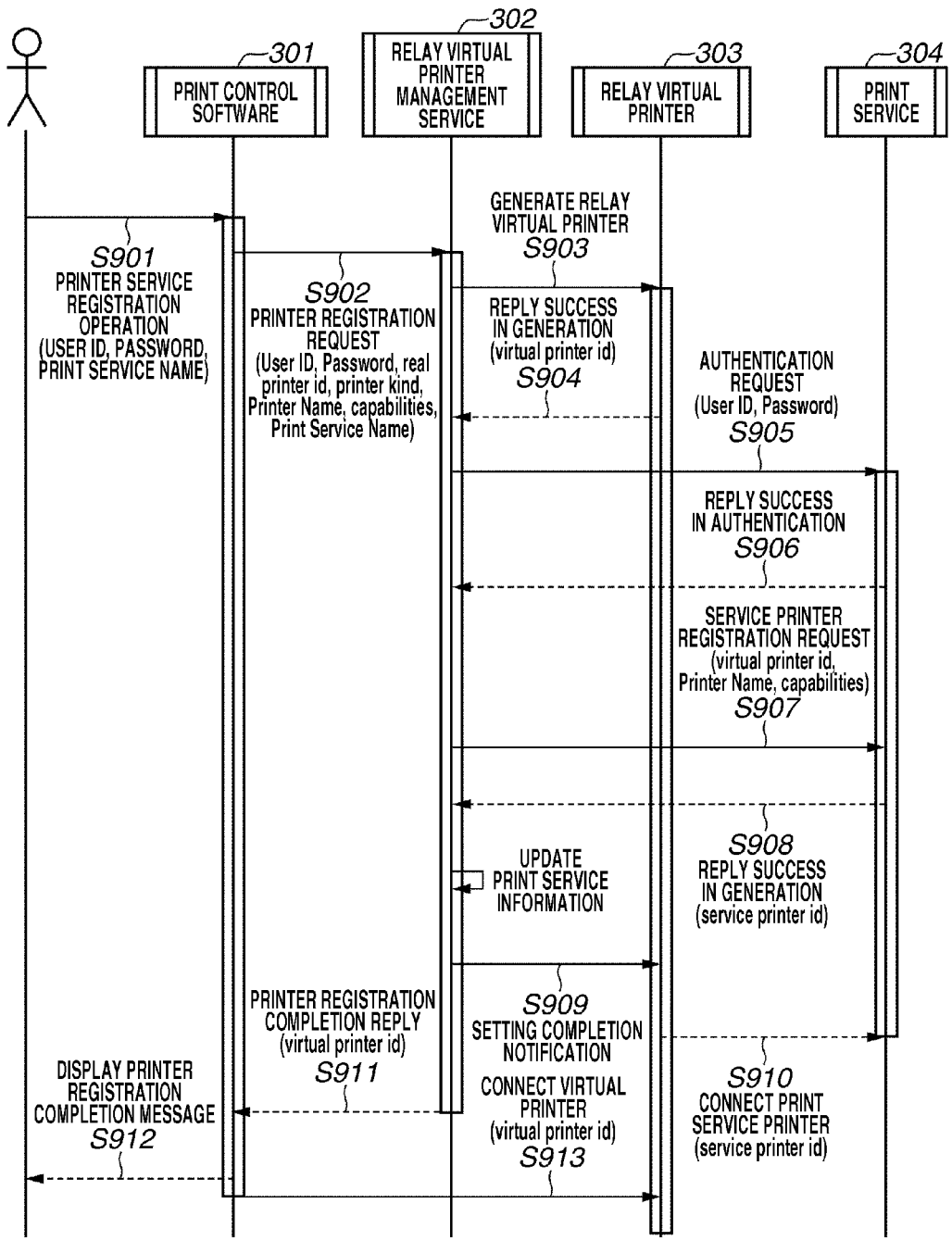

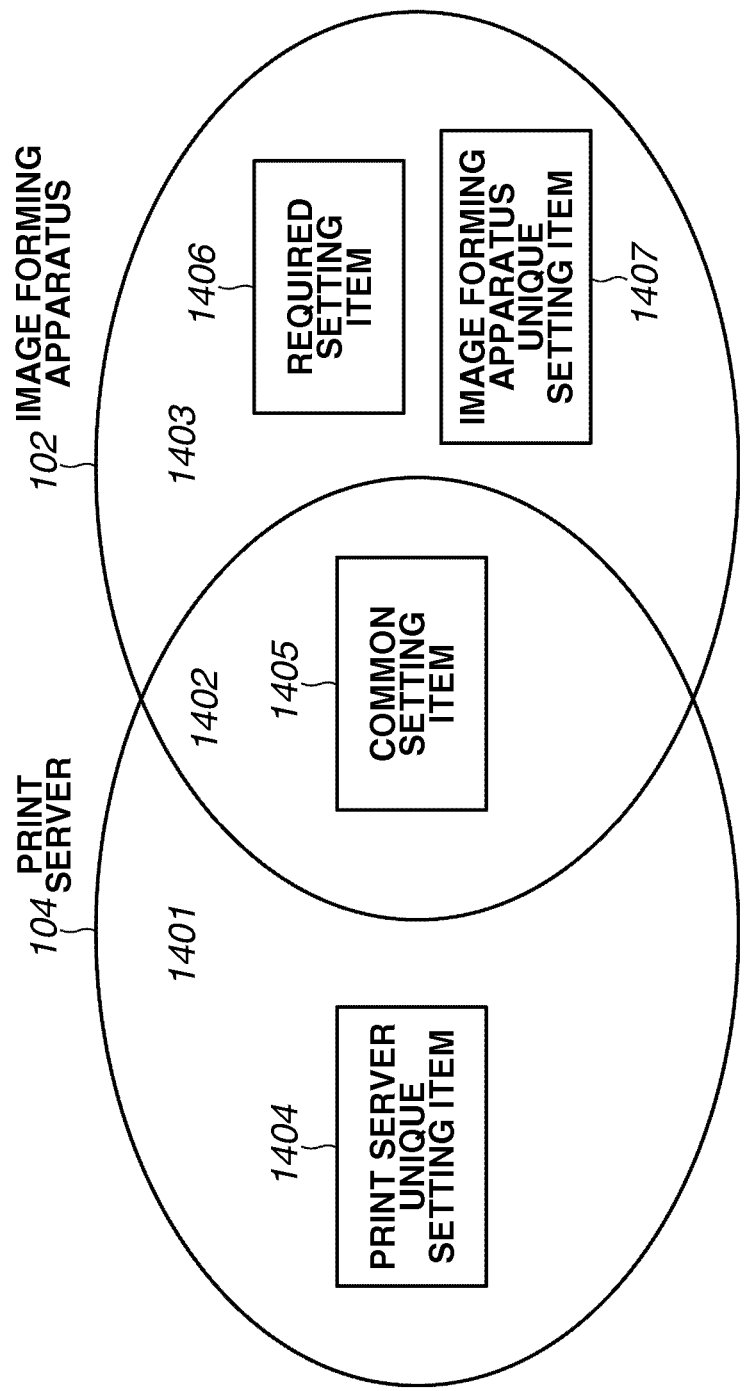

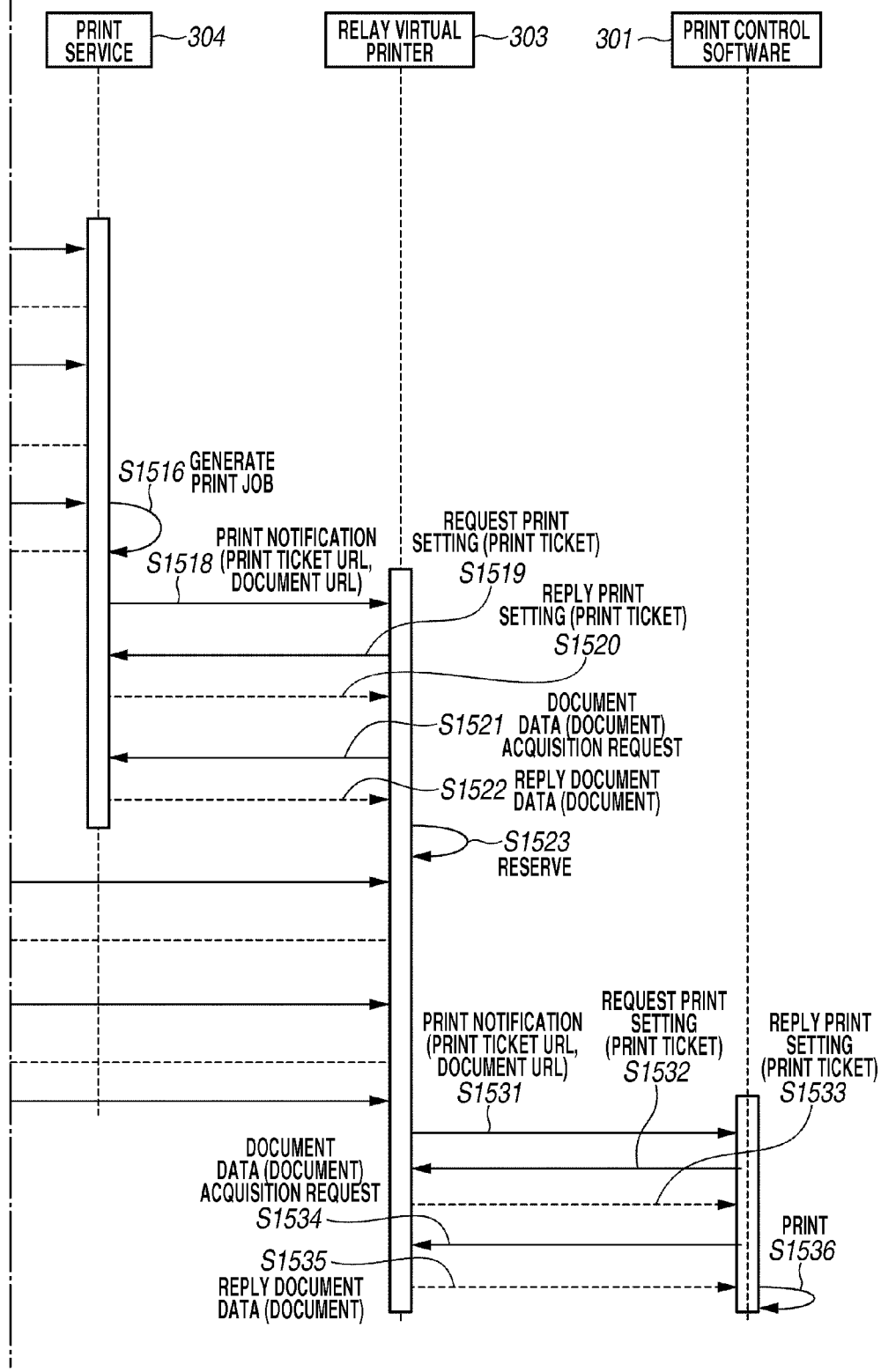

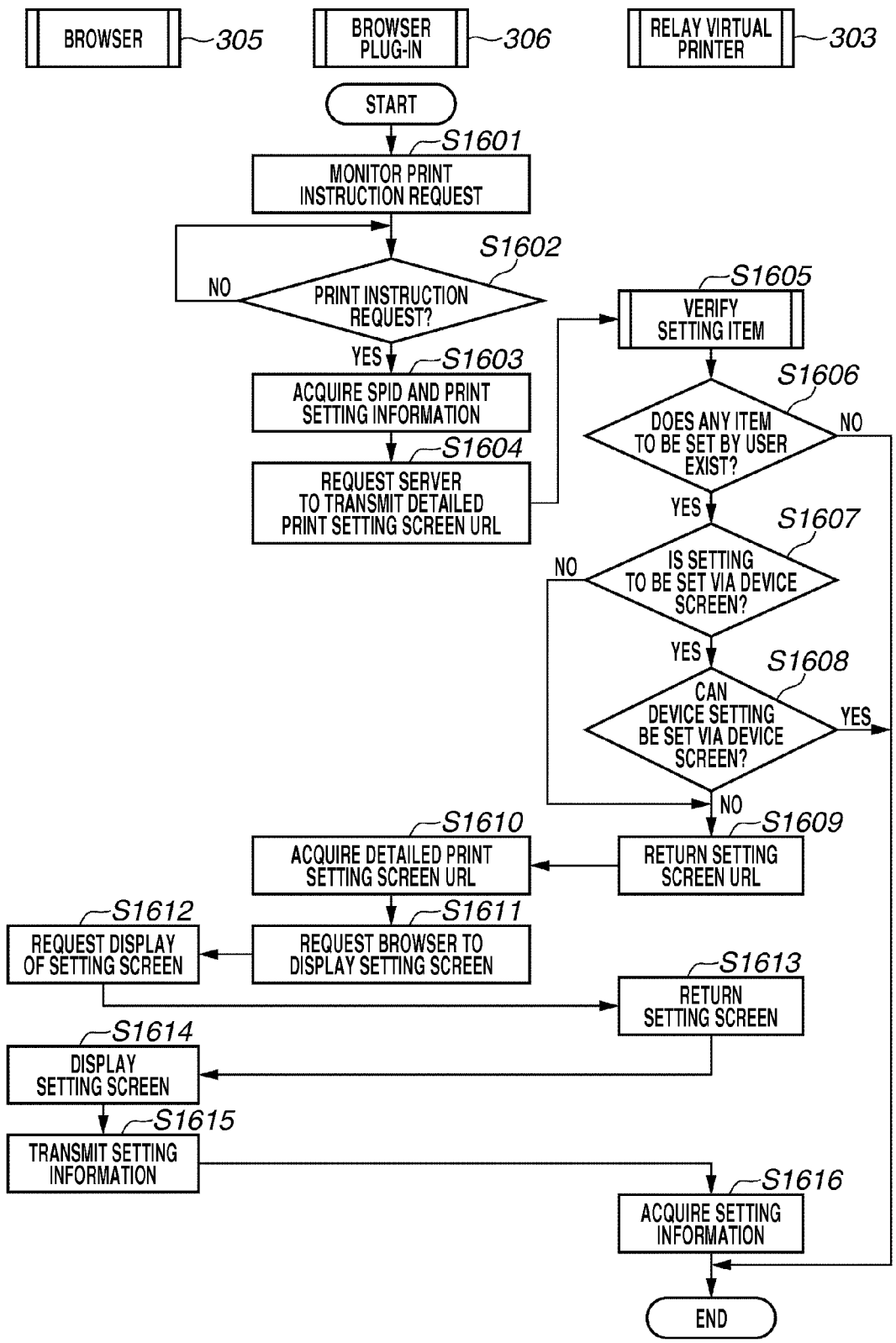

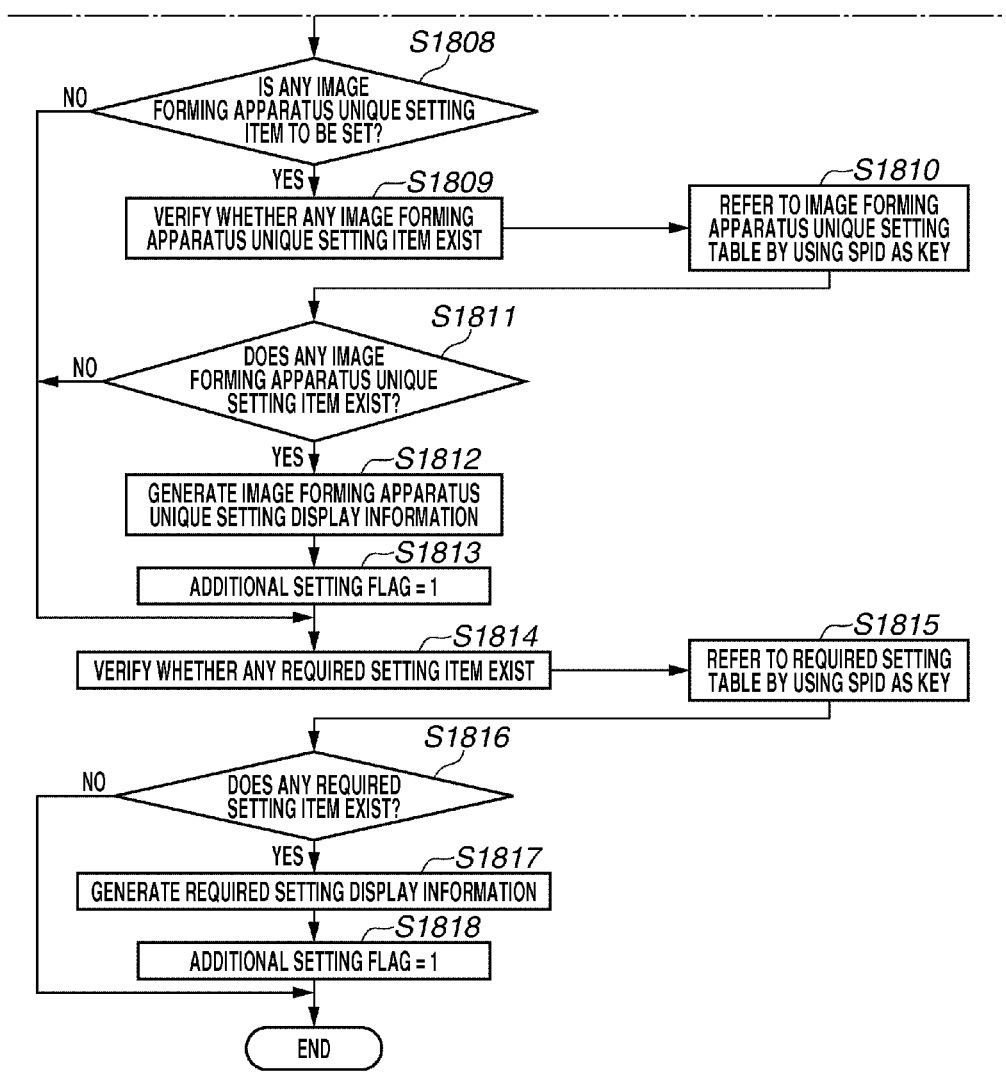

FIG.19C

DETAILED PRINT SETTING

COMBINATION OF "TWO-SIDED" SETTING AND "POSTCARD" SETTING IS NOT SUPPORTED BY THE SELECTED DEVICE. PLEASE CHANGE THE SETTING.

PRINT METHOD: ▼ ~1901
- ONE-SIDED
- TWO-SIDED

COMMON SETTING DISPLAY FIELD

DOCUMENT SIZE: ▼
- B5
- A4
- POSTCARD

---

PLEASE ENTER BILLING CODE.

| B5 | ~1902 REQUIRED SETTING DISPLAY FIELD

---

YOU CAN ADD DEVICE UNIQUE SETTING.

FINISHER: ▼ ~1903
- STAPLING
- Z-FOLDING

IMAGE FORMING APPARATUS UNIQUE SETTING DISPLAY FIELD

PAPER FEEDING: ▼
- AUTO
- MANUAL FEED TRAY
- CASSETTE 2

[EXECUTE PRINTING]

PRINT RELAY SYSTEM, PRINT RELAY SYSTEM CONTROL METHOD, AND STORAGE MEDIUM

BACKGROUND OF THE INVENTION

1. Field of the Invention

The present invention relates to a print relay system configured to receive a print job from a print server, a method for controlling the print relay system, and a storage medium therefor.

2. Description of the Related Art

In a conventional technique, a client transmits a print instruction to a server and the server that has received the print instruction converts a content to be printed into print data. Japanese Patent Application Laid-Open No. 2003-216367 discusses a system in which a client downloads web content data to be printed and a print format setting screen from a print server and the client transmits print data to an image forming apparatus to print the print data thereon.

As described above, in a conventional system, a server provides a service to a client. In a cloud computing system, which has recently attracted much attention, a server provides a service to a client. In cloud computing, data conversion and data processing are executed as distributed processing with using a large number of computing resources, as characteristic thereto, to process a plurality of requests from a large number of clients at the same time. Recently, very many vendors that provide various types of services have been established and have been providing web services on a cloud computing environment that implements the cloud computing described above.

In particular, Google (registered trademark) is one of the most active vendors. Google (registered trademark) has established very many large-scale data centers. Further, Google (registered trademark) has proposed a service to be provided in association with a device and has developed a method for data communication between a device and a service in a positive manner. For example, Google (registered trademark) has developed a data communication method for providing a service in association with an image forming apparatus. Furthermore, Google (registered trademark) has publicized an interface for implementing data communication between an image forming apparatus and the cloud computing environment provided by Google (registered trademark). If a user desires to utilize the service, the user is required to register information about an image forming apparatus to the cloud computing environment, i.e., a service environment that provides the service. The information about the image forming apparatus can be completely registered to the service environment by storing the information about the image forming apparatus in the environment of the service provider.

SUMMARY OF THE INVENTION

According to an aspect of the present invention, a print relay system capable of executing a communication between a print service system configured to provide a print setting screen to an information terminal operated by a user, to receive a print setting set by the user via the provided print setting screen, and to generate a print job based on the received print setting and stored settings for an image forming apparatus configured to output image data based on the print job includes a transmission unit configured to transmit to the information terminal, a detailed print setting screen via which a detailed print setting that cannot be set via the print setting screen can be set, a receiving unit configured to receive a print job, which is transmitted in a case that a print instruction is input by the information terminal to the print service system, a job changing unit configured to receive the detailed print setting set by the user via the detailed print setting screen transmitted by the transmission unit and to convert the print job received by the receiving unit into a new print job based on the receive detailed print setting, and a job transmission unit configured to transmit the new print job which has been converted by the job changing unit to the image forming apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 6 illustrates exemplary functions implemented by a relay virtual printer.

FIG. 7 illustrates exemplary functions implemented by a print service.

FIG. 8A illustrates an example of print service information. FIG. 8B illustrates an example of information stored by a print service information management unit. FIG. 8C illustrates an example of information stored by a printer information storage unit. FIG. 8D illustrates an example of information stored by the print service information management unit. FIG. 8E illustrates an example of information stored by the print service information management unit.

FIG. 9A illustrates an example of a registration user interface (UI). FIG. 9B illustrates an example of a print setting screen.

FIG. 10A illustrates an example of an element <Capabilities> of an image forming apparatus, which is expressed in the eXtended Markup Language (XML) format. FIG. 10B illustrates an example of the element <Capabilities>, which is expressed in the XML format and registered to a print server. FIG. 10C illustrates an example of a print setting expressed in the XML format. FIG. 10D illustrates an example of notification information expressed in the XML format. FIG. 10E illustrates an example of notification information expressed in the XML format.

FIG. 11A illustrates an example of the element <Capabilities> of the image forming apparatus, which is expressed in the JavaScript Object Notation (JSON) format. FIG. 11B illustrates an example of the element <Capabilities> expressed in the JSON format, which is registered to the print server. FIG. 11C illustrates an example of a print setting expressed in the JSON format. FIG. 11D illustrates an example of notification information expressed in the JSON format. FIG. 11E illustrates an example of notification information expressed in the JSON format.

FIG. 13 is a sequence chart illustrating exemplary processing for registering a relay virtual printer to a print service.

FIG. 14 schematically illustrates the element <Capabilities> that the print server can store and the element <Capabilities> that the image forming apparatus actually stores.

FIG. 16 is a flow chart illustrating processing for executing a detailed print setting, which is executed by a web browser, a web browser plug-in, and a relay virtual printer.

FIG. 19C illustrates an example of a detailed print setting screen.

DESCRIPTION OF THE EMBODIMENTS

Various exemplary embodiments, features, and aspects of the invention will be described in detail below with reference to the drawings.

The present invention is directed to a print relay system provided between an environment of a vendor that provides an interface and an image forming apparatus.

Figure 1:
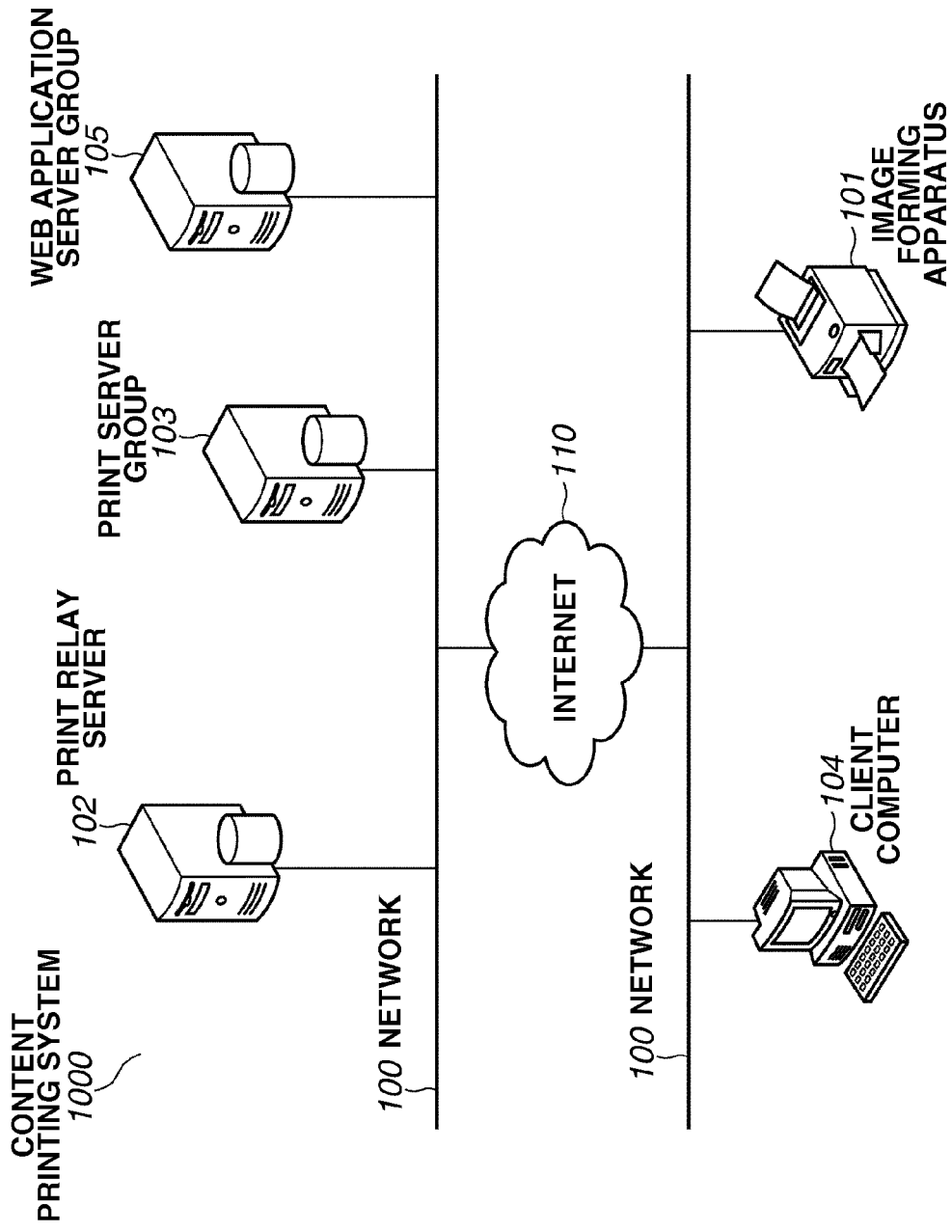
FIG. 1 illustrates an exemplary configuration of a content printing system.

To begin with, a configuration of a content printing system 1000 according to a first exemplary embodiment of the present invention will be described in detail below with reference to FIG. 1. FIG. 1 illustrates the configuration of the content printing system 1000. Referring to FIG. 1, the content system 1000 includes a client computer 104 and an image forming apparatus 101. The client computer 104 and the image forming apparatus 101 are installed in a user environment and can communicate with each other via a network 100. The network 100 is connected to the Internet 110. In addition, the content printing system 1000 includes a web application server group 105 and a print server group 103. The web application server group 105 and the print server group 103 are server groups provided by the same vendor and are in communication with each other via the network 100. The network 100 is connected to the Internet 110. The client computer 104 is equivalent to an information terminal operated by a user. The print server group 103 is equivalent to a print service system.

In the present exemplary embodiment, the two server groups are in communication with each other via the network 100 as described above. However, alternatively, the web application server group 105 and the print server group 103 can be connected via the Internet 110. In addition, the content printing system 1000 includes a print relay server 102. The print relay server 102 is connected to the network 100. The network 100 is connected to the Internet 110. Each apparatus and each server group included in the content printing system 1000 can be connected to one another via the Internet to implement a bidirectional data communication. In the present exemplary embodiment, it is supposed that one apparatus is provided as each of the above-described apparatuses. However, a plurality of apparatuses can be used for each of the above-described apparatuses. Further, in the present exemplary embodiment, it is supposed that each server group is constituted by a plurality of servers. However, one server can constitute each server group. The print relay server 102 is equivalent to the print relay system.

Figure 2:
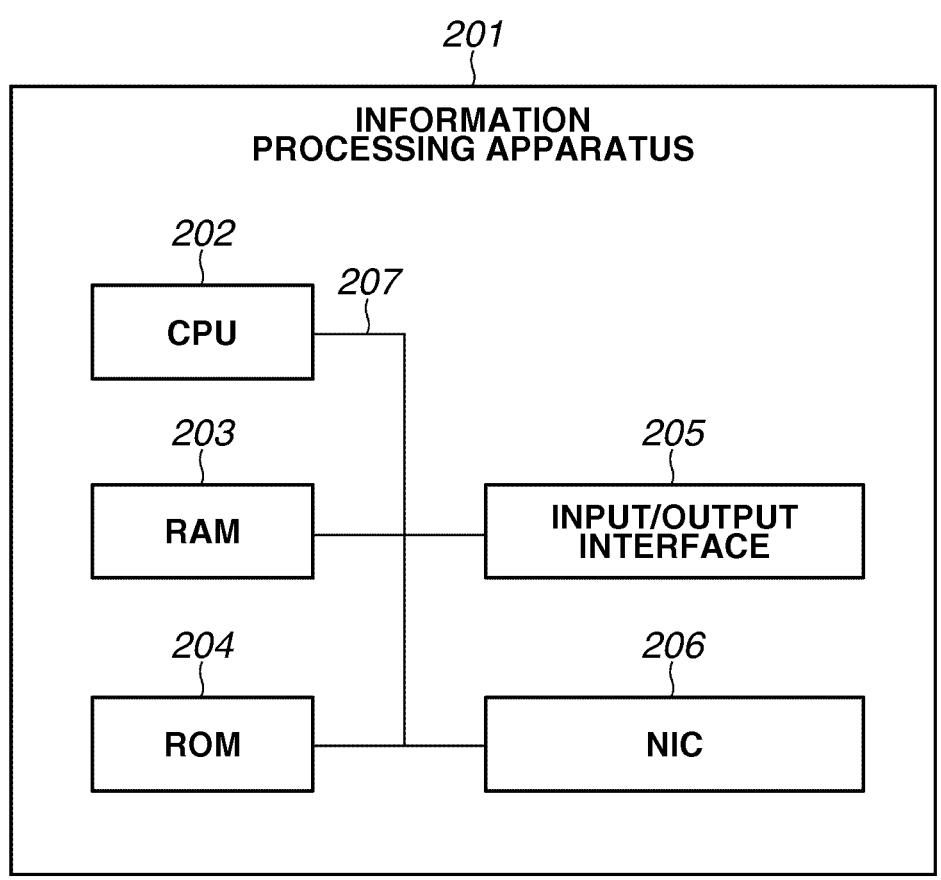
FIG. 2 illustrates an exemplary hardware configuration of apparatuses and server groups included in the content printing system.

A hardware configuration of each apparatus and each server group included in the content printing system 1000 will be described in detail below with reference to FIG. 2. FIG. 2 illustrates the hardware configuration of each apparatus and each server group which constitute the content printing system 1000. Each apparatus and each server group 201 is included in the content printing system 1000. A central processing unit (CPU) 202 executes various programs to implement various functions. A read-only memory (ROM) 204 is a unit configured to store various programs. A random access memory (RAM) 203 is used by the CPU 202 to load and execute the program stored in the ROM 204 on the RAM 203.

In addition, the RAM 203 can be used as a temporary work and storage area of the CPU 202. An input/output (I/O) interface 205 is an interface unit configured to transmit data to a display (not illustrated), which is connected to each apparatus and each server group and receive data input via a pointing device (not illustrated). A network interface card (NIC) 206 is a unit configured to connect each apparatus and each server group included in the content printing system 1000 to the network 100. The above-described units can execute bidirectional data communication via a bus 207. he image forming apparatus 101 includes a printing unit (not illustrated). The printing unit can transmit and receive data to and from each of the above-described units via the bus 207. The printing unit is capable of printing various types of image data, such as a raster image, on a recording medium or transmitting the image data to an external apparatus.

Figure 3:
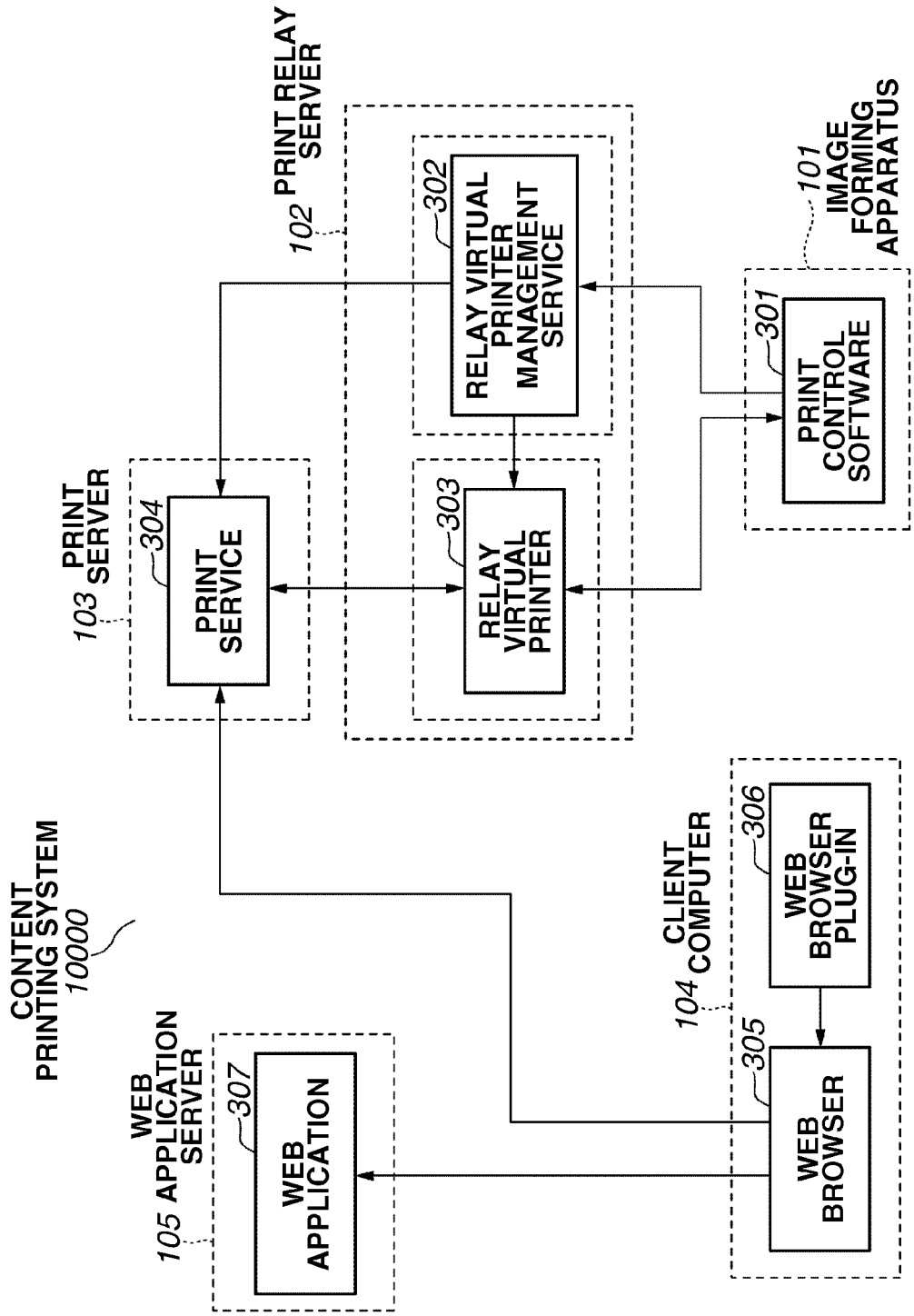
FIG. 3 illustrates an exemplary software configuration of the apparatuses and the server groups included in the content printing system.

Functions of each apparatus and each server group included in the content printing system 1000 will be described in detail below with reference to FIG. 3. FIG. 3 illustrates a software configuration of each apparatus and each server group, which are included in the content printing system 1000. A program that can implement the function of each software configuration illustrated in FIG. 3 is stored on the ROM 204 of each apparatus and each server group. The CPU 202 loads and executes the program on the RAM 203 to implement the function.

The functions of each apparatus and each server group will be described. The functions described below are categorized into the following two categories in a large sense. The functions of the first category are functions categorized in a registration function category, which are configured to register the image forming apparatus 101 to the print relay server 102, implement a relay virtual printer 303 on the print relay server 102, and register the relay virtual printer 303 to a print service 304. The functions of the second category are functions categorized in a print function category, which are configured to transmit an instruction to print a content generated by the web application server group 105 to the print server group 103 and print the print data transmitted by the print server group 103 on the image forming apparatus 101. In printing the print data transmitted by the print server group 103 on the image forming apparatus 101, the print server group 103 transmits the print data to the image forming apparatus 101 via the print relay server 102, which functions as a data transfer server, and the print data is printed by the image forming apparatus 101.

Figure 4:
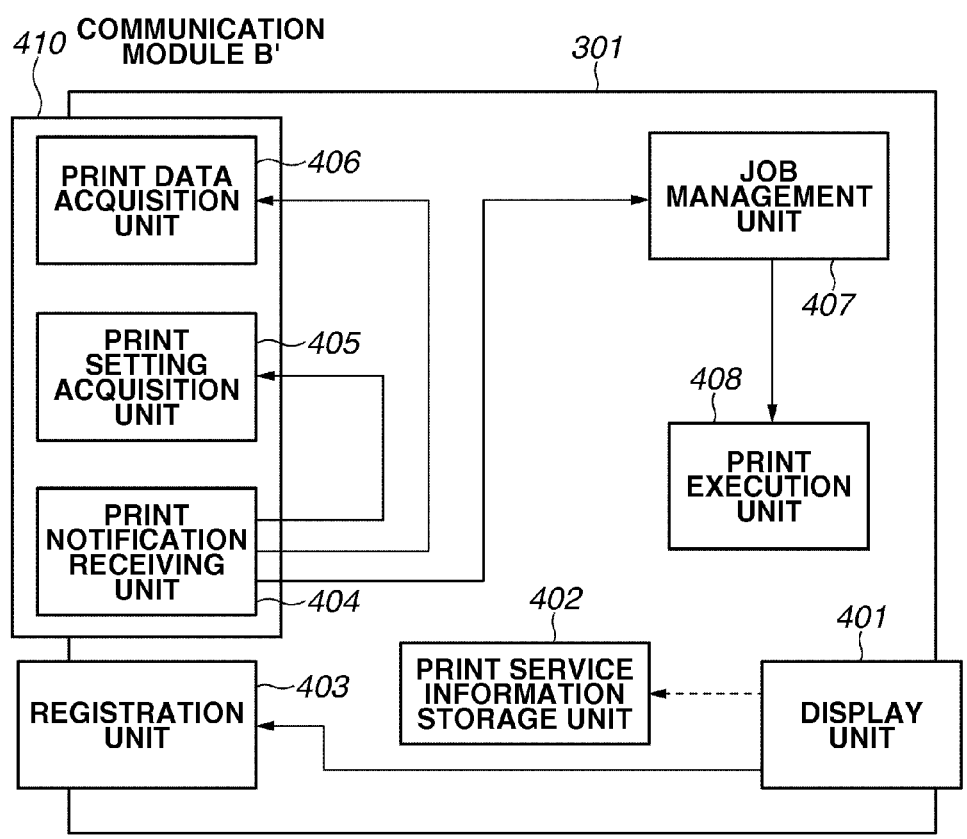
FIG. 4 illustrates exemplary functions implemented by a print control unit.

The functions which are categorized into the registration function category will be described in detail below. More specifically, in the following description, the functions of the image forming apparatus 101, which are categorized into the registration function category, will be described. The image forming apparatus 101 includes a print control unit 301. The print control unit 301 implements each function illustrated in FIG. 4. Referring to FIG. 4, the display unit 401 displays various screens. A print service information storage unit 402 includes print service information. FIG. 8A illustrates an example of the print service information. In the example illustrated in FIG. 8A, information about a plurality of print services is illustrated, and a print service 304 according to the present exemplary embodiment is equivalent to a Print Service A.

If it is instructed by the user to register the image forming apparatus 101 to the print service 304, a display unit 401 generates and displays a UI for registering the image forming apparatus 101 to the print service illustrated in FIG. 9A, based on the information illustrated in FIG. 8A. The user selects a print service to which the user desires to register the image forming apparatus 101 via the UI screen illustrated in FIG. 9A by using a pull-down 1001.

In the present exemplary embodiment, only one print service, i.e., the print service 304, exists. Accordingly, the user cannot select a print service other than the Print Service A. The user inputs a user identification data (ID) and a password for the selected print service in fields 1002 and 1003 (FIG. 9A) and presses a registration button 1004. When the registration button 1004 is pressed by the user, a registration unit 403 issues registration information. Further, the registration unit 403 transmits the issued registration information to a request receiving unit 501 included in a relay virtual printer management service 302, which will be described in detail below. The functions not described above will be described in detail below.

The registration information will be described in detail below. A print service name is included in the registration information. The print service name is information for identifying the print service selected by the user. Further, the print service name is information for identifying the print service 304 provided by the print server group 103. Further, the user ID and the password are included in the registration information. The user ID and the password are information required for the user to utilize the print service 304 and the web application server group 105. In the following description, the user ID and the password are collectively referred to as "user information".

In the present exemplary embodiment, it is supposed that the same vendor provides the web application server group 105 and the print server group 103. Accordingly, if the user utilizes a service provided by both the web application server group 105 and the print server group 103, the user can use the same user information. In the present exemplary embodiment, it is supposed that the user has previously registered the user information to the web application server group 105.

In addition, the registration information includes a real printer ID (RPID), which is unique identification information assigned to the image forming apparatus 101. Unique identification information is assigned to each image forming apparatus (not illustrated) including the image forming apparatus 101. Each image forming apparatus can be identified by the identification information. In the present exemplary embodiment, the installation location of the image forming apparatus can be identified by identifying the RPID. Further, an element <PrinterKind>, which is model information about the image forming apparatus 101, is included in the registration information.

Image forming apparatuses of the same model are assigned with the same model information. More specifically, if two image forming apparatuses are provided with the same communication module B', the image forming apparatuses are determined as the same model. The communication module B', a communication module A, a communication module A', and a communication module B will be described in detail below. In addition, a printer name of the image forming apparatus 101 is included in the registration information. The printer name is the name assigned to the image forming apparatus 101 and is used as the name of the image forming apparatus 101. Unlike the identification information, the printer name may be the same for each image forming apparatus. Further, an element <Capabilities> is included in the registration information.

The element <Capabilities> includes various information, such as information about whether the image forming apparatus 101 can execute two-sided print setting, whether the image forming apparatus 101 can execute color print setting, whether the image forming apparatus 101 can execute a bookbinding print setting, and the size of paper that can be output on the image forming apparatus 101. The element <Capabilities> is transmitted to the request receiving unit 501 in the XML format as illustrated in FIG. 10A. Referring to FIG. 10A, an element <Item> describes the capacity of the image forming apparatus 101. More specifically, in the example illustrated in FIG. 10A, the image forming apparatus 101 is capable of executing two-sided printing and color printing, and outputting using the paper of B5, A4, A3, and letter sizes.

In addition, it is described in the element <Capabilities> that the image forming apparatus 101 can execute bookbinding printing. Further, it is also described that an input of a billing code is required. Furthermore, for paper feeding, an auto sheet feeder and cassettes 1 and 2 can be utilized, and for finishing functions, Z-folding and stapling are available. The billing code is used in a law firm, for example, for executing printing with designating a charging target client information "billing code" to charge the costs of printing executed according to a request by the client. The billing code and a print result are mutually associated and recorded. The billing code is utilized to summarize the total charge amount for each client (charging target client) according to the recorded result.

Figure 5:
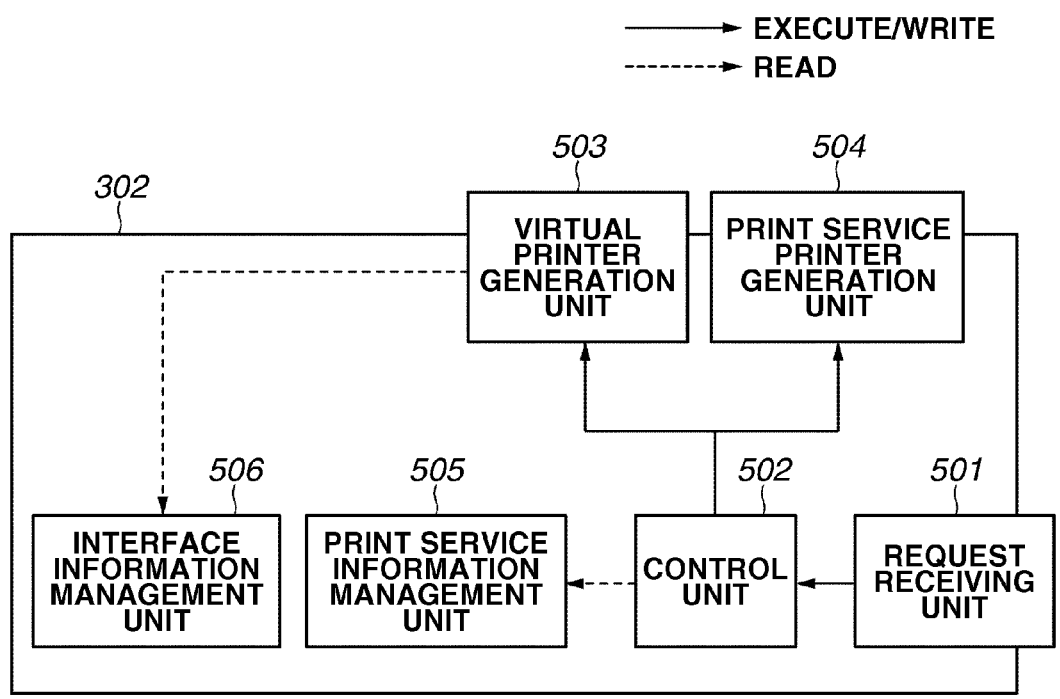
FIG. 5 illustrates exemplary functions implemented by a relay virtual printer management service unit.

The functions of the print relay server 102, which are categorized in the registration function category, will be described in detail below. The print relay server 102 includes the relay virtual printer management service unit 302. The relay virtual printer management service unit 302 implements each function illustrated in FIG. 5. The request receiving unit 501 receives the registration information. A control unit 502 acquires the registration information received by the request receiving unit 501 and interprets the registration information. Further, the control unit 502 inputs an instruction to a virtual printer generation unit 503 and a print service printer generation unit 504 for executing a following two types of processing. The first processing is processing executed by the virtual printer generation unit 503 to implement the function of the relay virtual printer 303. The second processing is processing executed by the print service printer generation unit 504 to register information about the relay virtual printer 303 to the print service 304.

The first processing, i.e., the processing executed by the virtual printer generation unit 503 to implement the function of the relay virtual printer 303 will be described in detail below. The relay virtual printer 303 implements each function illustrated in FIG. 6, which will be described in detail below. The virtual printer generation unit 503 identifies and acquires a communication module B 602, which is stored on an interface information management unit 506 based on the element <PrinterKind> transmitted from the control unit 502. The virtual printer generation unit 503 identifies and acquires a communication module A' 601, which is stored on the interface information management unit 506 based on the print service name.

The communication module B is a module for executing a communication with the image forming apparatus 101. As described above, the same model has the same communication module B, the communication module B can be identified by referring to the element <PrinterKind>. The communication module B communicates with a communication module B' 410 included in the print control unit 301. The communication module A' 601 is a module for executing a communication with the print server group 103. The communication module A' 601 can communicate with a communication module A 707 included in the print service 304. After acquiring the two communication modules, the virtual printer generation unit 503 implements a process (thread) in which the two communication modules are loaded. The process is equivalent to the relay virtual printer 303.

After implementing the relay virtual printer 303, the virtual printer generation unit 503 issues a virtual printer ID (VPID), which is identification information for identifying the implemented relay virtual printer 303. The issued VPID is transmitted to the control unit 502. The relay virtual printer 303 is implemented every time the registration information is transmitted from the image forming apparatus 101. Each of the implemented relay virtual printers is assigned with a VPID, which is a unique identifier. In the present exemplary embodiment, by identifying the VPID, the installation location of the relay virtual printer can be identified.

The second processing, i.e., the processing executed by the print service printer generation unit 504 for registering information about the relay virtual printer 303 to the print service 304 will be described in detail below. The control unit 502 transmits the user information to the print service printer generation unit 504. The print service printer generation unit 504 executes an authentication of the print server group 103 based on the received user information. If the authentication is successful, the print service printer generation unit 504 transmits the printer name, the element <Capabilities> (FIG. 10B) that can be processed by the print service 304, and the VPID to the print service 304.

Among the elements <Capabilities> of the image forming apparatus 101, the element <Capabilities> that can be processed by the print service 304 only can be registered to the print service 304. This is because even if the element <Capabilities> that the print service 304 does not support can be registered to the print service 304, the print service 304 cannot utilize the registered element <Capabilities>. In response to the transmitted information, the print service printer generation unit 504 receives a service printer ID (SPID). The SPID will be described in detail below.

The control unit 502 acquires the VPID and the SPID from the virtual printer generation unit 503 and the print service printer generation unit 504. After receiving the VPID and the SPID, the control unit 502 instructs a print service information management unit 505 to store the information thereon. The print service information management unit 505 stores the VPID, the SPID, and the registration information in association with one another as illustrated in FIG. 8B. In the example illustrated in FIG. 8B, the VPID is stored in a field 802. The print service name is stored in a field 803. The RPID is stored in a field 804. The element <PrinterKind> is stored in a field 805. The SPID is stored in a field 806. The printer name is stored in a field 807. The element <Capabilities> is stored in a field 808.

The functions of the print server group 103, which are categorized in the registration function category, will be described in detail below. The print server group 103 includes the print service 304. The print server group 103 virtualizes a plurality of servers and regards the plurality of servers as one server. The virtually provided one server implements the functions of the print service 304. More specifically, the print server group 103 activates a plurality of virtual machines in one server to implement the function of the print service 304 on each virtual machine. The print service 304 illustrated in FIG. 3 illustrates one of the virtual machines.

The print service 304 implements a function illustrated in FIG. 7. Referring to FIG. 7, a printer information registration unit 701 receives the user information from the print service printer generation unit 504. The printer information registration unit 701 reads the user information stored in a web application 307 included in the web application server group 105 to determine whether the received user information exists. If it is determined that the received user information exists, the printer information registration unit 701 recognizes that the authentication has been successfully completed. The printer information registration unit 701 receives the printer name, the element <Capabilities>, and the VPID from the print service printer generation unit 504. Further, the printer information registration unit 701 instructs the printer information storage unit 702 to store the received VPID.

The printer information registration unit 701 issues an SPID corresponding to the VPID and transmits the issued SPID to the printer information storage unit 702 and the print service printer generation unit 504. The printer information storage unit 702 stores the printer name, the element <Capabilities>, the VPID, the SPID, the user ID, and the password in association with one another.

In the example illustrated in FIG. 8C, the printer information storage unit 702 stores various information, such as the SPID in a field 813, the printer name in a field 814, the VPID in a field 815, the user name in a field 816, the password in a field 817, and the element <Capabilities> in a field 818. The other functions not described above will be described in detail below. The above-described functions are categorized into the registration function category, which includes functions for registering the image forming apparatus 101 to the print relay server 102, implementing the relay virtual printer 303 within the print relay server 102, and registering the relay virtual printer 303 to the print service 304.

FIG. 14 schematically illustrates the element <Capabilities> that the printer information storage unit 702 of the print server 103 can store and the element <Capabilities> that the image forming apparatus 101 actually stores. The element <Capabilities> that the printer information storage unit 702 can store includes an element (1) 1401 and an element (2) 1402. The element <Capabilities> that the image forming apparatus 101 actually stores includes the element (2) 1402 and an element (3) 1403. The element <Capabilities> that the printer information storage unit 702 can store refers to a function of the print server 103 for storing the resource for displaying a print setting screen. In addition, the element <Capabilities> refers to the capacity of the print server 103 for executing processing, which is executed by using a processing module configured to execute data conversion on a content.

As illustrated in FIG. 14, the element <Capabilities> that the print server 103 can store and the element <Capabilities> that the image forming apparatus 101 actually stores do not match. The elements <Capabilities> included in the element (2) 1402 can match. The elements <Capabilities> included in the element (2) 1402 and that can match each other will be hereafter referred to as a "common setting item" 1405. The value thereof corresponds to that illustrated in FIG. 10B. The elements <Capabilities> that do not match, which are included in the element (3) 1403, includes a required setting item 1406 and an image forming apparatus unique setting item 1407. The required setting item 1406 is the element <Capabilities> required to be set to the image forming apparatus. Printing cannot be executed unless the element <Capabilities> corresponding to the required setting item 1406 has been set. For example, the billing code is an example of the required setting item 1406. The image forming apparatus unique setting item 1407 is the element <Capabilities> that is dependent on a setting uniquely set to each image forming apparatus and an externally provided peripheral apparatus, such as a finisher. For example, paper feeding or a finisher is an example of the image forming apparatus unique setting item 1407.

If the present invention is not applied, if any element <Capabilities> that the print server 103 cannot store exists although the image forming apparatus includes various functions, the user cannot utilize the function of the image forming apparatus. Further, if the element <Capabilities> required to be set to the image forming apparatus 101 is not stored by the print server 103 as the element <Capabilities> that the print server 103 can store, the printing may not be available because the condition for activating the image forming apparatus 101 is not satisfied. Furthermore, if the print setting is executed according to a setting that can be set related to the print service only, the image forming apparatus 101 cannot output an output result desired by the user.

The functions categorized into the print function category will be described in detail below. First, the function of the client computer 104 will be described in detail below. The client computer 104 includes a web browser 305. The web browser 305 includes a web browser plug-in 306. The web browser plug-in 306 is an expansion function of the web browser 305. The web browser 305 transmits an instruction to print the content stored in the web application server group 105 to the web application server group 105.

The web browser 305 receives a command for accessing the print server group 103, i.e., a redirect instruction, from the web application server group 105. The web browser 305 accesses the print server group 103 according to the received redirect instruction. Further, the web browser 305 acquires a list of the image forming apparatuses available to the user of the web browser 305 for printing from the print server group 103 to which the web browser 305 has been accessing. Moreover, the web browser 305 displays the list of the image forming apparatuses.

The web browser 305 acquires, from the print server group 103, a print setting screen corresponding to an image forming apparatus selected by the user from the list and displays the acquired print setting screen. FIG. 9B illustrates an example of the print setting screen corresponding to the image forming apparatus selected by the user, which is displayed by the web browser 305, and the web browser plug-in 306.

The web browser 305 transmits a print setting value set by the user set via the print setting screen to the print server group 103. The web browser plug-in 306 detects that the print setting value set by the user has been transmitted to the print server 103 and transmits setting information to the relay virtual printer 303. The setting information includes the print setting value (FIG. 10C) set by the user via the print setting screen, the SPID corresponding to the selected image forming apparatus, and the plug-in setting information. The plug-in setting information is information for setting which of an image forming apparatus unique setting and a setting via a screen of the image forming apparatus during printing is to be executed. By pressing a detailed setting button 2405, the setting can be executed via a plug-in setting screen illustrated in FIG. 19B. The plug-in setting information set by the user is stored within the web browser plug-in 306.

If a uniform resource locator (URL) of the detailed print setting screen has been received from the relay virtual printer 303, the web browser plug-in 306 requests the web browser 305 to display the detailed print setting screen URL. To display the detailed print setting screen, the web browser 305 transmits a display request to the relay virtual printer 303. The detailed print setting screen is displayed by the web browser 305. FIG. 19C illustrates an example of the detailed print setting screen. The web browser 305 transmits detailed print setting information set by the user via the detailed print setting screen to the relay virtual printer 303. The web browser 305 and the web browser plug-in 306 included in the client computer 104 operate as described above. Via the detailed print setting screen, the user can set a detailed print setting that cannot be set via the print setting screen provided by the print server 103.

The function of the web application server group 105 will be described in detail below. The web application server group 105 includes the web application 307. The web application server group 105 virtualizes a plurality of servers and regards the plurality of servers as one server. The virtually provided one server implements the function of the web application 307. More specifically, the web application server group 105 activates a plurality of virtual machines in one server to implement the function of the web application 307 on each virtual machine.

The web application 307 provides a document generation service. For example, when the user is to distribute documents in a corporate meeting, the user can utilize the document generation service to generate the documents. If the client computer 104 utilizes the web application 307, it is not necessary to install the application into the client computer 104. In other words, in this case, the client computer 104 only has to install the web browser plug-in 306 and include the web browser 305. The web application 307 transmits screen information used for generating the document to the web browser 305.

The web application 307 authenticates the user based on the user information including the user ID and the password input by the user. If the user is normally authenticated, the web application 307 transmits the screen information for generating the document. After receiving the screen information, the web browser 305 displays a document generation screen for generating the document based on the screen information. Thus, the user can generate the document to be distributed in the meeting using the document generation screen.

The web application 307 receives the information about the document generated by the user using the document generation screen and generates a content of the document based on the received information. Further, the web application 307 stores the generated content on a storage device of the web application server group 105. The web application 307 provides an e-mail service and a schedule service as well as the document generation service.

Figure 12:
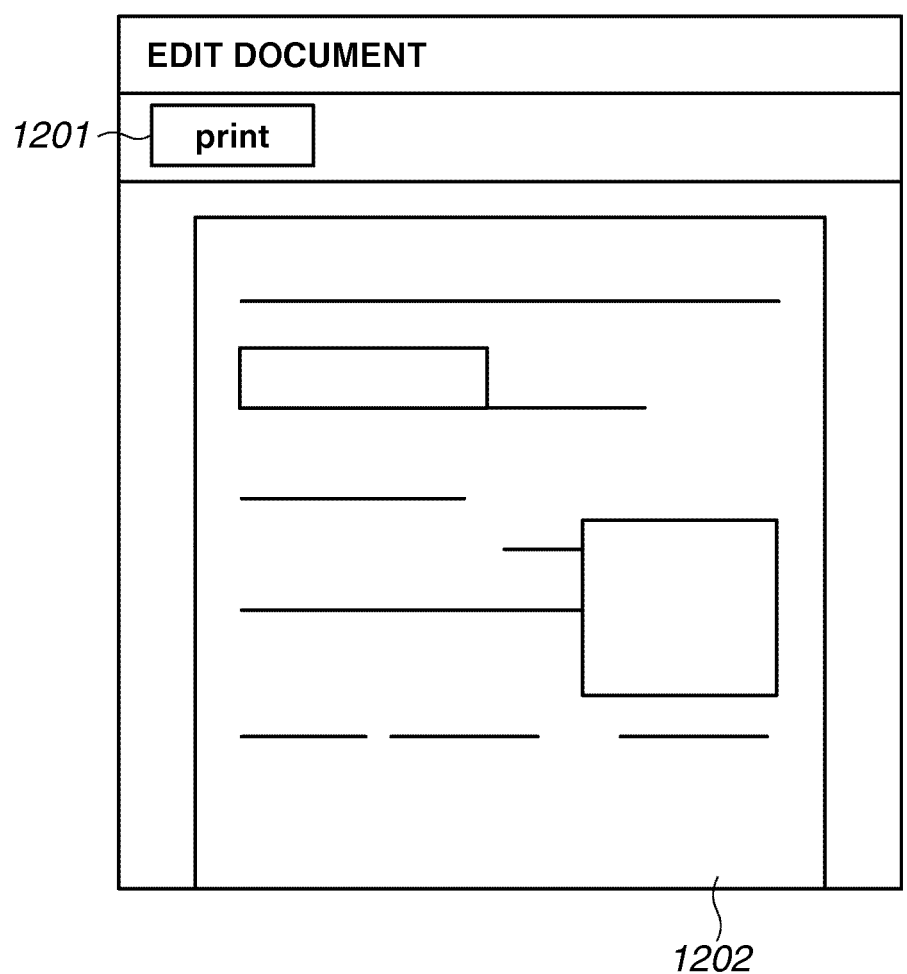
FIG. 12 illustrates an exemplary screen displayed when a print button is pressed.

If the user desires to print the content generated by utilizing the document generation service, the user can execute the printing by pressing a print button displayed on the document generation screen. FIG. 12 illustrates an exemplary screen displayed when a print button 1201 is pressed. Referring to FIG. 12, the screen displays a content 1202, which has been generated by the user. The web application 307 receives information indicating that the print button has been pressed and transmits an access command for accessing to the print server group 103, i.e., a redirect instruction, to the web browser 305. The redirect instruction includes a request for acquiring the list corresponding to the user who is utilizing the above-described web browser 305, content identification information for identifying the content instructed by the user to be printed, and the user information.

Further, if a request for acquiring a content is received from the print server group 103, the web application 307 transmits the requested content to the print server group 103, which is identified based on the content identification information for identifying the content received together with the content acquisition request. The web application 307 included in the web application server group 105 operates in the above-described manner.

The functions of the print server group 103 that are categorized into the print function category will be described in detail below. Referring to FIG. 7, the print service 304 included in the print server group 103 includes a printer information presentation unit 703. When the list acquisition request is received from the web browser 305, the printer information presentation unit 703 transmits the requested list to the web browser 305.

The printer information presentation unit 703 identifies the SPID and the printer name stored by the printer information storage unit 702 based on the user information. Then, the printer information presentation unit 703 generates a list of the image forming apparatuses available to the user based on the SPID and the printer name. Further, the printer information presentation unit 703 receives the SPID of a symbol corresponding to the image forming apparatus selected by the user from the list. The symbol refers to an icon for the image forming apparatus displayed as the list. The printer information presentation unit 703 identifies the element <Capabilities> stored by the printer information storage unit 702 based on the received SPID. Further, the printer information presentation unit 703 generates a print setting screen and transmits the generated print setting screen to the web browser 305.

The printer information storage unit 702 generates a print setting screen illustrated in FIG. 9B based on the information described in the element <Capabilities> illustrated in FIG. 10B. Referring to FIG. 9B, the printer information storage unit 702 generates the print setting screen via which the user can select the print setting described in the element <Capabilities> that the print service 304 can process only.

A print instruction receiving unit 704 (FIG. 7) receives the print setting set via the print setting screen and the SPID from the web browser 305. If the web browser 305 has accessed the print service 304 based on the redirect instruction, the print instruction receiving unit 704 receives content identification information for identifying the content instructed by the user to be printed.

A print data generation unit 705 receives the content identification information from the print instruction receiving unit 704 and acquires the content to be printed from the web application 307 based on the received content identification information. Further, the print data generation unit 705 receives the print setting input by the user via the print instruction receiving unit 704 and the SPID corresponding to the image forming apparatus selected by the user. Furthermore, the print data generation unit 705 converts the content into print data based on the content and the print setting acquired from the web application 307.

The control unit 706 acquires the print data, the print setting, and the SPID from the print data generation unit 705. The print setting is described in the XML format as illustrated in FIG. 10C. Referring to FIG. 10C, in the present exemplary embodiment, it is supposed that the user has set the two-sided setting, the monochromatic printing, and the letter paper size.

The communication module A 707 can communicate with an apparatus having the communication module A' 601. The communication module A 707 is an interface for data communication with the apparatus having the communication module A' 601. The communication module A' 601 cannot communicate with the communication module A707, and the reasons thereof will be described after describing the functions of the communication module A 707.

The communication module A 707 includes a print data storage unit 708, a print setting information storage unit 709, and a print job notification unit 710. The print data storage unit 708 receives and stores the print data from the control unit 706. The print setting information storage unit 709 receives and stores the print setting from the control unit 706. The print data storage unit 708 and the print setting information storage unit 709 receive a storage instruction from the control unit 706 and execute storage processing. When it is notified from the print data storage unit 708 and the print setting information storage unit 709 that the storage has been completed, the control unit 706 instructs the print job notification unit 710 to transmit notification information.

When the instruction to transmit notification information is received from the control unit 706, the print job notification unit 710 acquires the SPID from the control unit 706 and identifies the VPID based on the information stored on the printer information storage unit 702. In the present exemplary embodiment, information about a transmission destination corresponding to the SPID, i.e., the VPID in the present exemplary embodiment is referred to as a "target". The user designates the VPID by selecting the SPID. The print job notification unit 710 acquires the storage locations of the print data and the print setting from the control unit 706, and generates notification information A. Further, the print job notification unit 710 transmits the notification information A to the registered image forming apparatus.

The print job notification unit 710 is equivalent to a first transmission unit. The information transmitted by the print job notification unit 710 is equivalent to information about data. The information about the data according to the present exemplary embodiment is the notification information A. However, the information about the data may include information and data other than the notification information A according to a specification of the communication. This applies to notification information B, which will be described in detail below. In the present exemplary embodiment, the registered image forming apparatus refers to a relay virtual printer, which corresponds to the VPID. The notification information A is expressed in the XML format illustrated in FIG. 10D. Referring to FIG. 10D, an element <Item> 1001 describes the storage location of the print data. An element <Item> 1002 describes the storage location of the print setting.

The communication module other than the communication module A' 601 cannot communicate with the communication module A 707 due to the following reason. More specifically, the communication module other than the communication module A' 601 cannot interpret the notification information A, which is received from the print job notification unit 710 and expressed in the XML format.

In addition, in the following case, the communication module other than the communication module A' 601 cannot communicate with the communication module A 707. For example, if the communication module A 707 does not include the print job notification unit 710 and if the communication module A' 601 acquires the print data and the print setting by a different method, the communication module A' 601, which acquires the notification information A, cannot acquire the print data and the print setting. This is because the communication module A' 601, which acquires the notification information A, has been currently waiting for the notification information A to be transmitted from the communication module A 707 and the print data and the print setting cannot be acquired until the notification information A is notified. It is required for the communication module A' 601 that can communicate with the communication module A707 to have a configuration for inquiring the communication module A 707 whether data to be acquired exists.

As described above, if the communication module A' 601 does not comply with the data communication specification of the communication module A 707, the communication module A 707 cannot communicate with the communication module A' 601. In the present exemplary embodiment, a method that enables the communication between the communication module A 707 and the communication module A' 601 is referred to as a specification of a vendor that provides the print server group 103. The specification greatly depends on the vendor that manages the print server group 103.

The vendor that manages the print server group 103 implements the communication module A 707 on the print server group 103 and publicizes an application programming interface (API) for communicating with the communication module A 707. In fact, the above-described system has been actually established. The vendor that manages the print server group 103 has publicized a unique specification that enables a data communication between the print server group 103 and a device. Under these circumstances, it is required for a device vendor of the image forming apparatus 101 to install the communication module A' 601, in which the API is implemented, on the image forming apparatus 101 to enable the image forming apparatus 101 to communicate with the print server group 103.

Suppose that the vendor that manages the print server group 103 has changed the configuration of the communication module A 707. In other words, suppose that the vendor that manages the print server group 103 has changed the specification. In this case, the device vendor is required to change the communication module A' 601 of the image forming apparatus 101 due to the change in the specification. The load of the communication module changing operation is very high. This is because the image forming apparatuses may be installed in various customer environments and in order to enable the communication between the print server group 103 and the image forming apparatus again, it is required that a service person visits the various customer environments to change the communication module A' 601.

If the above-described problem is to be solved by distributing the communication module A' 601 without sending the service person to each customer environment, the load on the communication band may become high because it is required to transmit the communication module A' 601 to a plurality of image forming apparatuses. The above-described problem can be solved by using the functions of the print relay server 102 categorized in the print function category described below. The specification of the data communication that the vendor that manages the print server group 103 publicizes is equivalent to a first specification. The interfaces for the communication between the communication module A 707 and the communication module A' 601 is generated in compliance with the first specification.

The functions categorized in the print function category of the print relay server 102, which implement the functions illustrated in FIG. 6, will be described in detail below. Referring to FIG. 6, the relay virtual printer 303 includes the communication module A' 601 and the communication module B 602. A print notification receiving unit 603 of the communication module A' 601 receives the notification information A transmitted from the print job notification unit 710. Because the relay virtual printer 303, instead of the RPID of the image forming apparatus 101, has been registered to the print service 304, the notification information A is transmitted to the print notification receiving unit 603.

Because the communication module A' 601 is used as a pair of modules with the communication module A 707, the print notification receiving unit 603 can interpret the notification information A. The print notification receiving unit 603 is equivalent to a first acquisition unit. The print notification receiving unit 603 verifies the storage locations of the print data and the print setting described in the notification information A and notifies the these pieces of the information to a print setting acquisition unit 604 and a print data acquisition unit 605. The print setting acquisition unit 604 acquires the print setting from the print setting storage unit 709 based on the notified print setting storage location.

On the other hand, a plug-in status receiving unit 609 receives the print setting value (FIG. 10C) set by the user via the print setting screen of the web browser 305 from the web browser plug-in 306, the SPID corresponding to the selected image forming apparatus, and the plug-in setting information. Then, the plug-in status receiving unit 609 notifies a control unit 613 of the received information. The control unit 613 identifies the element <Capabilities> of the image forming apparatus 101 according to the plug-in setting information, the print setting transmitted to the print server 103, and the SPID and determines whether it is necessary to execute a detailed print setting. Processing for the determination will be described in detail below. If it is determined that an additional print setting is necessary, the plug-in status receiving unit 609 transmits a URL of the detailed print setting screen to the web browser plug-in 306.

When a request for a detailed print setting screen is received from the web browser 305, a printer information presentation unit 610 generates a detailed print setting screen and transmits the generated detailed print setting screen to the web browser 305. Subsequently, a print instruction receiving unit 611 receives the detailed print setting information input by the user via the detailed print setting screen.

The print data acquisition unit 605 acquires the print data from the print data storage unit 708 based on the notified print data storage location and notifies the acquired print data to the control unit 613. The control unit 613 instructs a print data generation unit 612 to store the print data acquired by the print data acquisition unit 605.

However, if the user has issued an instruction to execute a detailed print setting and if the detailed print setting has not been executed yet at this timing, the print data is reserved at the print data generation unit 612. Accordingly, the print data is not transmitted to the image forming apparatus 101 until the user executes the detailed print setting. After storing the print setting, a print setting storage unit 607 notifies the control unit 613 of the storage location.

When the notification of the storage location is received from a print data storage unit 606 and the print setting storage unit 607, the control unit 613 generates notification information B. FIG. 10E illustrates an example of the notification information B, which is expressed in the XML format. Referring to FIG. 10E, an element <Item> 1003 describes the storage location of the print data, and an element <Item> 1004 describes the storage location of the print setting. The control unit 613 instructs a print job notification unit 608 to transmit the notification information B to the print control unit 301. The print job notification unit 608 transmits the notification information B to the print control unit 301.

The print job notification unit 608 is equivalent to a second transmission unit. In the above-described manner, the communication module A' 601, which is the former communication module, transfers the print data and the print setting to the communication module B 602, which is the latter communication module. In this manner, the inter-module communication is implemented.

The communication module B', which corresponds to the communication module B, is implemented on the image forming apparatus 101. As described above, the image forming apparatus 101 acquires print job notification from the print relay server 102 via the print server group 103. Further, the image forming apparatus 101 acquires the print data from the print data storage location described in the job notification information.

The function categorized in the print function category of the image forming apparatus 101 will be described in detail below. Referring to FIG. 4, the print control unit 301 includes the communication module B' 410. A print notification receiving unit 404 of the communication module B' 410 receives notification information B or C, which is transmitted from the print job notification unit 608. The print notification receiving unit 404 is equivalent to a second acquisition unit. Because the communication module B' 410 is used as a pair of modules with the communication module B 602, the print notification receiving unit 404 can interpret the notification information B and C.

The specification specified by the device vendor to provide the data communication between the relay virtual printer 303 or the print service 304 and the image forming apparatus 101 is equivalent to a second specification and is the specification that can be handled by the device vendor. The interfaces for the communication between the communication module B 602 and the communication module B' 410 is generated in compliance with the second specification.

The print notification receiving unit 404 verifies the storage location of the print data described in the notification information B. and notifies the information to a print setting acquisition unit 405 and a print data acquisition unit 406. The print setting acquisition unit 405 acquires the print setting from the print setting storage unit 607 based on the notified print setting storage location. The print data acquisition unit 406 acquires the print data from the print data storage unit 606 and the print data storage unit 708 based on the notified print data storage location. The acquired print setting and the print data are transmitted to a job management unit 407 via the print notification receiving unit 404.

The job management unit 407 acquires the print data and the print setting information and instructs a print execution unit 408 to execute printing. After receiving the print instruction, the print execution unit 408 instructs the printing unit to generate a raster image based on the print setting and the print data and to print the generated raster image. In the above-described manner, the functions included in the print function category that for printing of the print data transmitted from the print server group 103 by the image forming apparatus according to an instruction transmitted to the print server group 103 for printing the contents generated by the web application server group 105.

Processing for registering the image forming apparatus 101 to the print relay server 102, for implementing the relay virtual printer 303 within the print relay server 102, and for registering the relay virtual printer 303 to the print service 304 will be described in detail below with reference to FIG. 13.

Referring to FIG. 13, in step S901, the user selects a print service to be registered via the UI of the image forming apparatus 101 and inputs the user ID and the password. In step S902, the print control unit 301 of the image forming apparatus 101 requests the relay virtual printer management service 302 to register the printer. In requesting the registration of the printer, the print control unit 301 transmits the above-described registration information to the relay virtual printer management service 302.

In step S903, the relay virtual printer management service 302 implements the relay virtual printer 303 based on the registration information. In step S904, the relay virtual printer 303 transmits the VPID to the relay virtual printer management service 302 in a reply as a success in generation of the relay virtual printer.

In step S905, the relay virtual printer management service 302 transmits the user ID and the password to the print service 304 and to authenticate the user. If the user is normally authenticated by the print service 304, then in step S906, the print service 304 notifies the relay virtual printer management service 302 that the user has been normally authenticated.

In step S907, the relay virtual printer management service 302 requests the print service 304 to register the VPID as the printer (service printer) provided by the print service 304. In step S908, after registering the VPID as the service printer, the print service 304 issues an SPID and transmits the SPID to the relay virtual printer management service 302.

In step S909, the relay virtual printer management service 302 instructs the print service information storage unit 703 to store the SPID and notifies the relay virtual printer 303 that the setting has been completed. In step S910, the relay virtual printer 303 accesses and connects to the communication module A 707 of the print service 304 based on the SPID and waits until the notification information A is transmitted.

In step S911, the relay virtual printer management service 302 notifies the print control unit 301 that the registration of the printer has been completed. In step S912, the print control unit 301 issues an instruction to display a message indicating that the image forming apparatus has been completely registered on the UI of the image forming apparatus 101. In step S913, the print control unit 301 accesses and connects to the relay virtual printer 303 based on the VPID and waits until the notification information B is transmitted. The image forming apparatus is registered in the above-described manner.

Figure 15A:
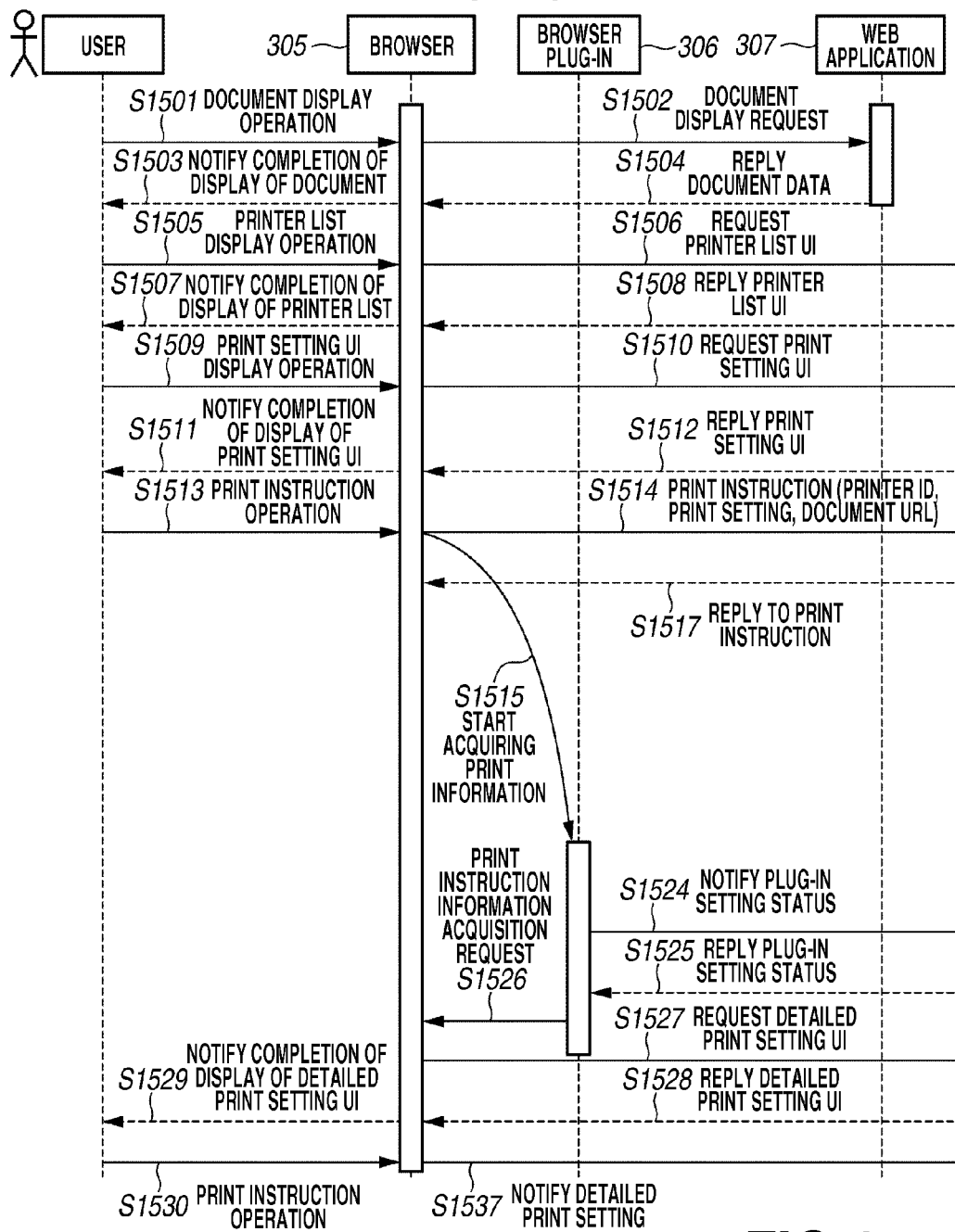
FIG. 15 (including FIG. 15A and FIG. 15B) is a sequence chart illustrating exemplary processing for printing print data received from a print server group on an image forming apparatus.

Processing for printing the print data transmitted from the print server group 103 by the image forming apparatus according to an instruction transmitted to the print server group 103 for printing the contents generated by the web application server group 105 will be described in detail below with reference to FIG. 15 (including FIG. 15A and FIG. 15B).

Figure 15:
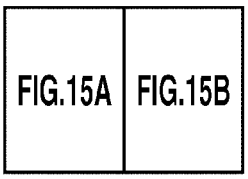

Referring to FIG. 15, in step S1502, the web browser 305 requests the web application 307 to display the content that the user desires to edit. In step S1504, the web application 307 transmits a content screen corresponding to the requested content to the web browser 305.

In step S1506, when the user inputs a print instruction via the content screen, the web browser 305 requests a list screen of image forming apparatuses (service printers) registered to the print service 304.

In step S1508, the print service 304 transmits the list screen of service printers corresponding to the user who utilizes the web browser 305 to the web browser 305. In step S1510, when the user has selected the desired image forming apparatus from the list screen, the web browser 305 requests the print service 304 to transmit a print setting screen corresponding to the selected image forming apparatus.

In step S1512, the print service 304 transmits the print setting screen to the web browser 305. In step S1514, the web browser 305 transmits the print setting that has been input by the user via the print setting screen to the print service 304. In step S1515, the web browser 305 causes the web browser plug-in 306 to start processing for acquiring print information.

In step S1516, the print service 304 acquires the content whose printing has been instructed by the user from the web application 305 and converts the acquired content into print data based on the received print setting.

Further, the print service 304 combines the converted print data and the print setting and generates a print job based on the combined data and information about the data. Accordingly, the print job at least includes the print data and the print setting information.

Figure 17:
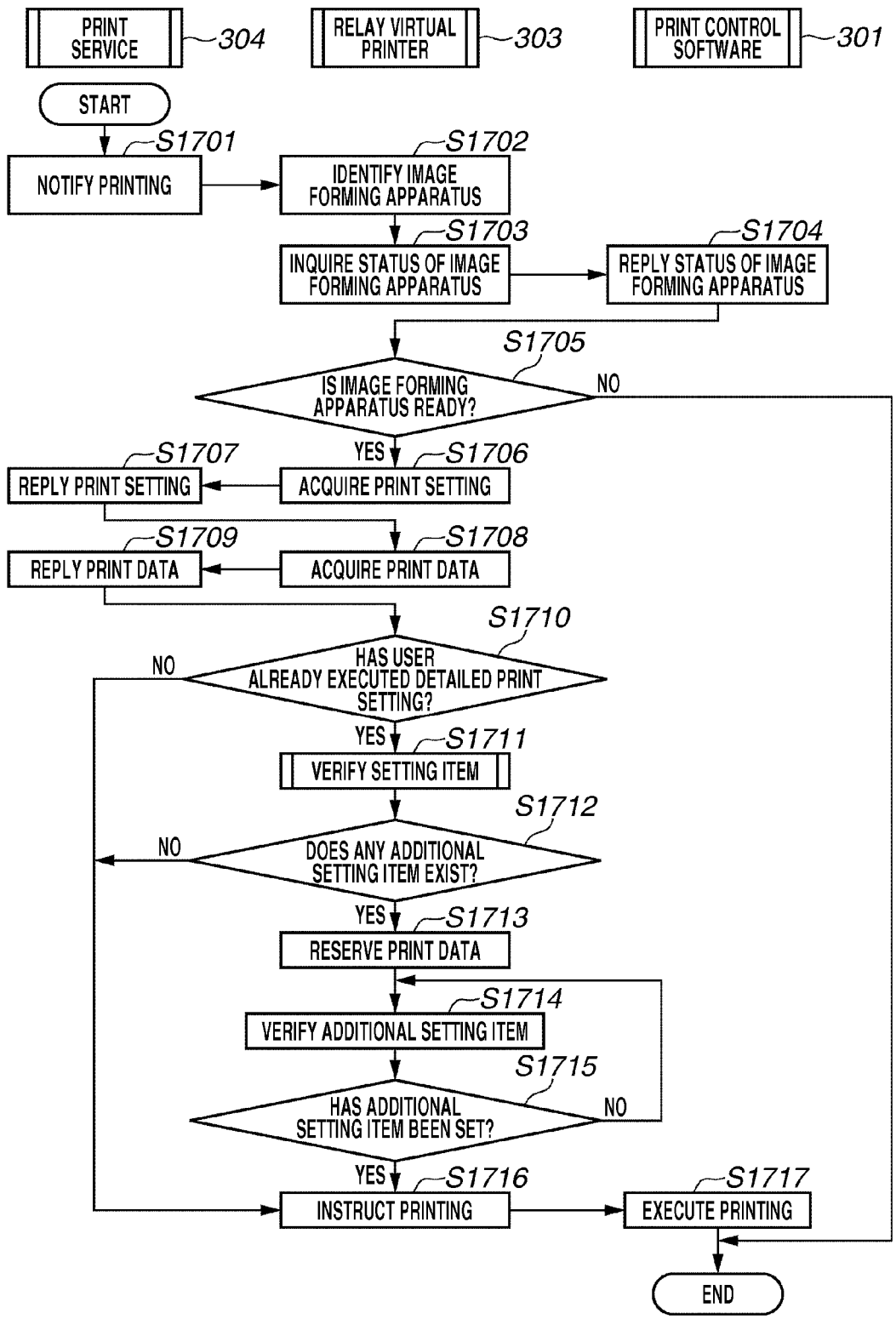
FIG. 17 is a flow chart illustrating processing for printing print data input by a print server group and executed by the relay virtual printer.

A flow of print processing in steps S1518 through S1523 and in step S1530 and beyond will be described in detail below with reference to the flow chart of FIG. 17. Referring to FIG. 17, in step S1701, the print service 304 notifies the relay virtual printer 303 that a job has been generated.

In step S1702, after receiving the notification from the print service 304, the control unit 613 of the relay virtual printer 303 acquires the RPID based on the SPID. In step S1703, the communication module B 602 makes an inquiry for a status of the image forming apparatus 101 thereto corresponding to the RPID. In step S1704, the print control software 301 of the image forming apparatus 101 transmits the status of the image forming apparatus 101 to the relay virtual printer 303.

Figure 19A:
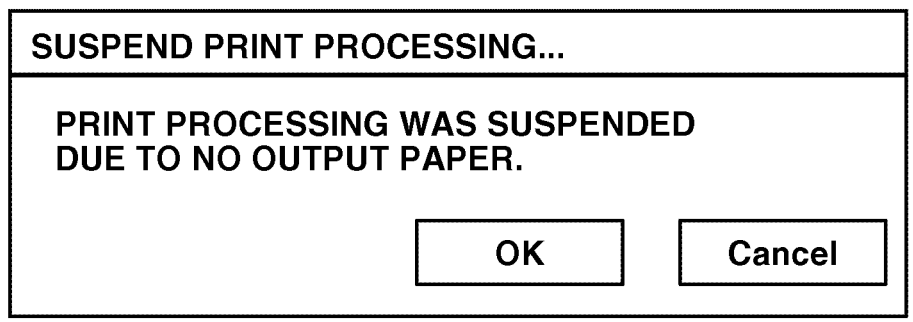
FIG. 19A illustrates an example of a message to be displayed on the web browser if printing has failed.
Figure 19B:
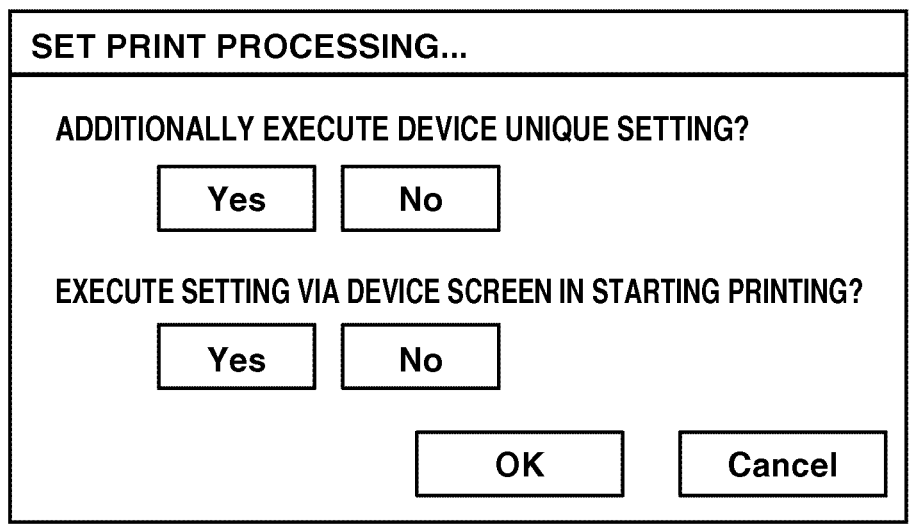
FIG. 19B illustrates an example of a plug-in setting screen.

In step S1705, the control unit 613 ends the processing if the image forming apparatus 101 is in a paper shortage state, a network disconnected state, or a power-off state. In these cases, the plug-in status receiving unit 609 stores information about the failed printing by using the SPID as a key. In addition, in response to the request from the web browser plug-in 306 in step S1524, the plug-in status receiving unit 609 transmits a message indicating that the printing has failed. The web browser plug-in 306 controls the web browser 305 to display a print failure message. FIG. 19A illustrates an example of a message to be displayed on the web browser 305 if printing has failed.

In step S1706, the print setting acquisition unit 604 requests the print service 304 to acquire the print setting. In step S1708, the print data acquisition unit 605 acquires the print data from the print service 304.

In step S1710, the control unit 613 determines whether the detailed print setting has already been executed by the user. If it is determined that the user has already instructed the detailed print setting (Yes in step S1710), then the processing advances to step S1711. In step S1711, the control unit 613 executes setting item verification processing. The setting item verification processing will be described in detail below.

In step S1712, the control unit 613 determines whether any additional setting item exists. If it is determined that any additional setting item exists (Yes in step S1712), then the processing advances to step S1713. In step S1713, the print data generation unit 612 temporarily reserves the print data acquired by the print data acquisition unit 605. In steps S1714 and S1715, the control unit 613 monitors a detailed print setting to be set by the user.

On the other hand, if it is determined that no detailed print setting has been instructed (NO in step S1710) and after executing the processing in step S1715, in step S1716, the relay virtual printer 303 transmits the print job and instructs printing of the print job.

If the detailed print setting has been set by the user, the control unit 613 replaces the print setting information (FIG. 10D) received by the print setting acquisition unit 604 with the information illustrated in FIG. 10E based on the print setting set by the user via the detailed print setting screen. The print job illustrated in FIG. 10D can be converted into a format illustrated in FIG. 11E. After the print setting information received from the print server 103 is rewritten according to the user instruction in the above-described manner, a new print job is transmitted to the image forming apparatus 101.

In the present exemplary embodiment, a new print job is generated by rewriting the print setting information. However, a new print job can be generated by rewriting the print data or the notification information. For example, a new print job is generated if it is necessary to change the layout of the print data or modify the method for converting the communication protocol.

Detailed print setting processing, which is executed by the web browser 305, the web browser plug-in 306, and the relay virtual printer 303 in step S1515 and steps S1524 through S1531 will be described in detail below with reference to the flow chart of FIG. 16.

Referring to FIG. 16, in step S1601, the web browser plug-in 306 monitors a print instruction input by the web browser 305 to the print service 304. In step S1602, if the web browser plug-in 306 detects the print instruction input by the web browser 305 to the print service 304 (YES in step S1602), then in step S1603, the web browser plug-in 306 acquires the SPID and the print setting information from the print instruction (print request).

In step S1604, the web browser plug-in 306 transmits the SPID, the print setting information, and the plug-in setting information to the plug-in status receiving unit 609 of the relay virtual printer 303. In addition, the web browser plug-in 306 requests URL information about the detailed print setting screen. In step S1605, the control unit 613 executes setting item verification processing. The setting item verification processing will be described in detail below.

In step S1606, the control unit 613 determines whether any item to be set by the user during the setting item verification processing exists. If it is determined that any item to be set by the user during the setting item verification processing exists (Yes in step S1606), then the processing advances to step S1607. In step S1607, the control unit 613 determines whether the detailed print setting is to be set via the screen of the image forming apparatus by referring to the plug-in setting information.

If it is determined that the detailed print setting is to be set via the screen of the image forming apparatus (Yes in step S1607), then the processing advances to step S1608. In step S1608, the control unit 613 inquires the print service information management unit 505, via the control unit 502, as to whether the detailed print setting can be set via the screen of the image forming apparatus. The print service information management unit 505 refers to a table 812 illustrated in FIG. 8B to verify whether the detailed print setting can be set via the screen of the image forming apparatus. If it is determined that the detailed print setting can be set via the screen of the image forming apparatus (Yes in step S1608), then the processing illustrated in FIG. 16 ends because the detailed print setting is to be executed via the screen of the image forming apparatus.

In this case, the plug-in status receiving unit 609 transmits processing end information to the web browser plug-in 306. In step S1609, the plug-in status receiving unit 609 returns the URL of the detailed print setting screen to the web browser plug-in 306. The detailed print setting screen is generated based on information included in the table 812 in FIG. 8B or is provided by combining already provided screens together. The detailed print setting screen includes a print setting item that cannot be set by the print service 304.

In step S1610, the web browser plug-in 306 acquires the URL of the detailed print setting screen. In step S1611, the web browser plug-in 306 transmits a request for displaying the detailed print setting screen to the web browser 305. In step S1612, the web browser 305 requests the relay virtual printer 303 to transmit the setting screen having the URL of the above-described detailed print setting screen. In step S1613, the printer information presentation unit 610 transmits the detailed print setting screen. FIG. 19C illustrates an example of the detailed print setting screen.

Referring to FIG. 19C, a common setting display field 1901 is a display field for prompting the user to execute the print setting again if any conflict in the common setting item 1405 arises. A required setting display field 1902 is a display field for displaying a setting item that is required to be set when the printing is executed by the image forming apparatus. An image forming apparatus unique setting display field 1903 displays the image forming apparatus unique setting item 1407.

In step S1614, the web browser 305 displays the detailed print setting screen. After the user has executed the setting via the detailed print setting screen and pressed an OK button, the processing advances to step S1615. In step S1615, the web browser 305 transmits the detailed print setting information to the relay virtual printer 303. In step S1616, the control unit 613 of the relay virtual printer 303 acquires the detailed print setting information.

After acquiring all pieces of the detailed print setting information, the control unit 613 executes processing in step S1716. In other words, the relay virtual printer 303 overwrites the current print job to generate a new print job and transmits the new print job to the image forming apparatus 101.

The setting item verification processing in steps S1711 and S1606 will be described in detail below with reference to the flow chart of FIG. 18 (including FIG. 18A and FIG. 18B).

Figure 18:
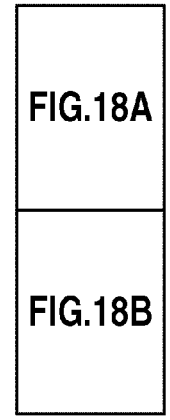
FIG. 18 (including FIG. 18A and FIG. 18B) is a flow chart illustrating processing for verifying a setting item, which is executed by a control unit.
Figure 18A:
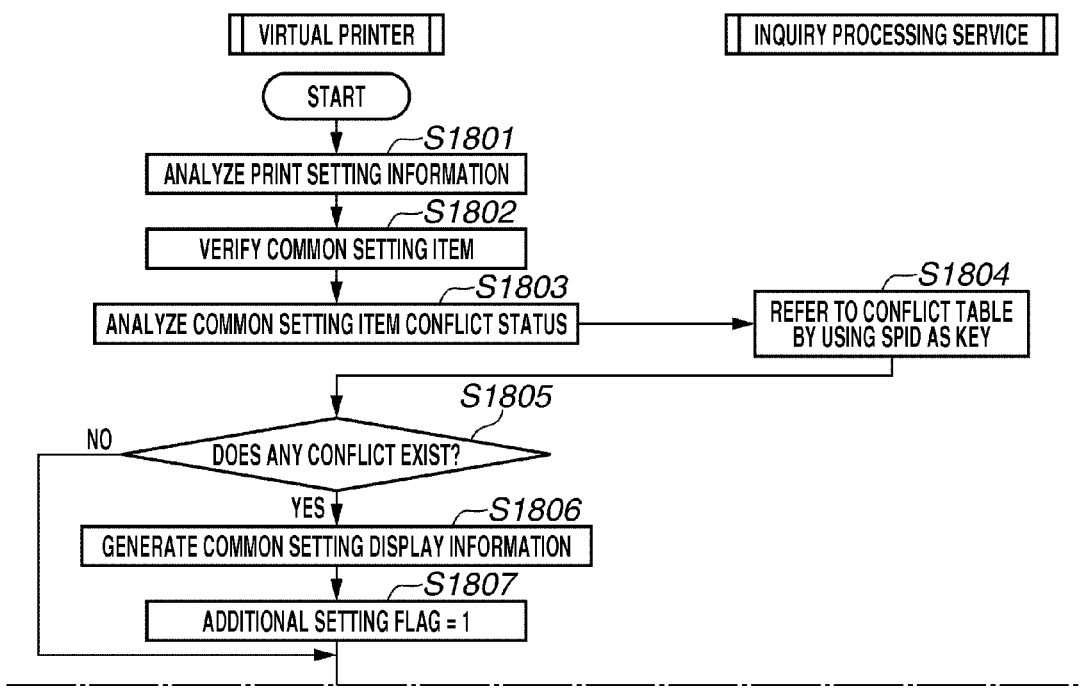

Referring to FIG. 18, in step S1801, the control unit 613 reads the print setting information. In step S1802, the control unit 613 verifies the common setting item 1405 by referring to the print setting information (FIGS. 10C and 10D).

In step S1803, the control unit 613 analyzes whether any conflict exists in the print setting. In analyzing whether any conflict exists, the control unit 613 identifies the RPID based on the SPID and refers to a conflict table illustrated in FIG. 8E, which is managed by the print service information management unit 505, to determine whether any conflict exists. In other words, conflict analysis is to determine whether any combination of the common setting items 1405 that is not supported by the image forming apparatus exists.

The combination not supported by the image forming apparatus is different for different image forming apparatuses. In FIG. 8E, it is illustrated that the setting of the letter size paper setting cannot be combined with the two-sided printing setting.

In step S1805, if the control unit 613 determines that any conflict exists (Yes in step S1805), then the processing advances to step S1806. In step S1806, the printer information presentation unit 610 generates the common setting display field 1901. In step S1807, the control unit 613 sets a value "1" to the additional setting flag.

In step S1808, according to the plug-in setting information, the control unit 613 determines whether the image forming apparatus unique setting item 1407 is to be set. If it is determined that the image forming apparatus unique setting item 1407 is to be set (Yes in step S1809), then the processing advances to step S1809. In step S1809, the control unit 613 verifies whether any image forming apparatus unique setting item 1407 exists.

In step S1810, the control unit 613 refers to the table managed by the print service information management unit 505 based on the RPID and verifies a finisher setting 809 and a paper feed setting 810 illustrated in FIG. 8B.

In step S1811, if the control unit 613 determines that any image forming apparatus unique setting item 1407 exists (Yes in step S1811), then the processing advances to step S1812. In step S1812, the printer information presentation unit 610 generates the image forming apparatus unique setting display field 1903. In step S1813, the control unit 613 sets a value "1" to the additional setting flag.

In step S1814, the control unit 613 verifies whether any required setting item 1406 exists. In step S1815, the control unit 613 refers to the table managed by the print service information management unit 505 via the control unit 502 and verifies whether any required setting item 1406 exists.

In step S1816, the control unit 613 refers to a billing code 811 in FIG. 8B to determine whether any required setting item 1406 exists. If it is determined that any required setting item 1406 exists (Yes in step S1816), then the processing advances to step S1817. In step S1817, the printer information presentation unit 610 generates the required setting display field 1902. In step S1818, the control unit 613 sets a value "1" to the additional setting flag. If the additional setting flag has the value "1", it is indicated that the setting of the detailed print setting is required.

According to the value set to the above-described flag, items to be displayed on the detailed print setting screen vary. For example, in the above-described case, only the detailed print setting that cannot be set via the print setting screen provided by the print server 103 can be set via the detailed print setting screen. In another example, both the detailed print setting that cannot be set via the print setting screen provided by the print server 103 and the print setting that can be set via the print setting screen provided by the print server 103 can be set via the detailed print setting screen.

In step S1531, the relay virtual printer 303 notifies the print control unit 301 that the job has been generated. In step S1532, the print control unit 301 requests the relay virtual printer 303 to acquire the print setting.

In step S1533, the print control unit 301 acquires the print setting from the relay virtual printer 303. In step S1534, the print control unit 301 requests the relay virtual printer 303 to acquire the print data.

In step S1535, the print control unit 301 acquires the print data from the relay virtual printer 303. In step S1536, the print control unit 301 draws a raster image based on the acquired print setting and print data and controls the image forming apparatus 101 to print the raster image.

With the above-described configuration, the present exemplary embodiment can implement the printing that utilizes the functions of the image forming apparatus 101 even if the functions of the print server 103 differ from the functions of the image forming apparatus 101. In particular, in the present invention, it is assumed that the vendor of the print server and the vendor of the image forming apparatus 101 differ from each other. More specifically, the present invention having the above-described configuration can absorb any functional inferiority of the print server within the print relay system. Accordingly, the user can sufficiently utilize the functions of the image forming apparatus 101.

In the cases supposed in the present invention, the user cannot execute print settings for sufficiently utilizing the functions of the image forming apparatus 101 via the print setting screen provided by the print server because the vendor that provides the print server may not have sufficiently understood the configuration applied to the image forming apparatus 101. With the above-described configuration, the present invention can allow the vender of the web service that develops a method for providing a print service and the device vendor of the image forming apparatus 101 to respectively perform the divided labor of developing or designing the service or the device.

According to another aspect of the present invention, the present invention can allow the user to sufficiently utilize the functions of the image forming apparatus 101 without requiring the print server to change the specification thereof.

In the first exemplary embodiment described above, the print server 103 generates the print setting screen by using the element <Capabilities> described in the XML format. However, any other format can be used for describing the element <Capabilities>. For example, the print server 103 can acquire the element <Capabilities> expressed in the JSON format (FIG. 11A) from the image forming apparatus 101.

Further, in the first exemplary embodiment, the client computer 104 transmits the print setting expressed in the XML format to the print server 103. However, the print setting can be expressed in any other format. For example, the client computer 104 can transmit a print setting expressed in the JSON format (FIG. 11C) to the print server 103.

Furthermore, in the first exemplary embodiment, the notification information A and the notification information B are generated in the same format (the XML format). However, the notification information A and B can be generated in different formats. For example, the notification information A can be expressed in the JSON format (FIG. 11D). In the example illustrated in FIG. 11D, the storage location of the print data is described in an element <dataUrl> 1801 while the storage location of the print setting is described in an element <settingUrl> 1802.

The formats of the notification information A and the notification information B can be selected vice versa. For example, the notification information A can be expressed in the XML format while the notification information B can be expressed in the JSON format illustrated in FIG. 11E. In the example illustrated in FIG. 11E, the storage location of the print data is described in an element <dataUrl> 1803 while the storage location of the print setting is described in an element <settingUrl> 1804.

Program codes, which are installed to a computer and configured to implement the functional processing of the present invention with the computer, can also implement the present invention. To paraphrase this, the present invention also includes the computer program configured to implement the functional processing of the present invention. Accordingly, the program can be configured in any form, such as object code, a program executed by an interpreter, and script data supplied to an operating system (OS).

Aspects of the present invention can also be realized by a computer of a system or apparatus (or devices such as a CPU or a micro processing unit (MPU)) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-256316 filed Nov. 16, 2010, which is hereby incorporated by reference herein in its entirety.

What is claimed is:

1. A print relay server for transmitting a print job transmitted from a print service system to an image forming apparatus, the print service system being connected to the print relay server and configured to provide a service print setting screen to an information terminal operated by a user, to receive a print setting set by the user via the provided print setting screen, and to generate the print job based on the received print setting and stored settings for the image forming apparatus connected to the print relay server and configured to output image data based on the print job, the print relay server comprising:
   a screen transmission unit configured to transmit, to the information terminal, a detailed print setting screen, wherein the detailed print setting screen includes a detailed print setting that can be set through the detailed print setting screen provided to the information terminal by the print relay server but cannot be set through the service print setting screen provided to the information terminal by the print service system directly;
   a receiving unit configured to receive a print job from the print service system, which is transmitted in a case that a print instruction is input by the information terminal to the print service system;
   a job changing unit configured to receive the detailed print setting set by the user via the detailed print setting screen transmitted by the screen transmission unit and to convert the print job received by the receiving unit from the print service system into a new print job based on the receive detailed print setting; and
   a job transmission unit configured to transmit the new print job which has been converted by the job changing unit to the image forming apparatus.

2. The print relay server according to claim 1, wherein, in response to the print relay server receiving, from the information terminal operated by the user, information indicating that the detailed print setting, that cannot be set via the service print setting screen, is to be set, the screen transmission unit transmits the detailed print setting screen to the information terminal.

3. The print relay server according to claim 2,
   wherein information included in the print job received by the receiving unit includes print setting information, and
   wherein, in response any information indicating that the detailed print setting is to be set not being received by the print relay server, the job transmission unit transmits at least the received print setting information to the image forming apparatus without changing the print setting information.

4. The print relay server according to claim 3, wherein the job changing unit is configured to convert the print job into a new print job by rewriting at least the print setting information included in the print job.

5. The print relay server according to claim 1, wherein the detailed print setting that cannot be set via the service print setting screen only can be set via the detailed print setting screen.

6. The print relay server according to claim 5, wherein the detailed print setting screen is configured such that both the detailed print setting that cannot be set via the service print setting screen and a print setting that can be set via the service print setting screen can be set via the detailed print setting screen.

7. The print relay server according to claim 6, wherein the detailed print setting screen includes a common setting item and at least one item among required setting items and image forming apparatus unique setting items,
- wherein the common setting item is an item for setting the print setting that can be set via the service print setting screen,
- wherein a required setting item is an item for setting a print setting which cannot be set via the service print setting screen and which is required to be set to utilize the image forming apparatus, and
- wherein the image forming apparatus unique setting item is an item for setting a print setting which cannot be set via the service print setting screen and which is required to be set to utilize a function of the image forming apparatus.

8. The print relay server according to claim 7,
- wherein the common setting item includes an item for executing a setting of at least one of a two-sided print setting, a paper size, and a bookbinding print setting,
- wherein the required setting item includes an item for executing a setting for charging a customer, and
- wherein the image forming apparatus unique setting item includes an item for executing a setting related to finishing.

9. The print relay server according to claim 8, wherein, in response to determining that a combination of print settings that is not supported by the image forming apparatus has been set in the print setting included in the print job based on the print setting information included in the print job received by the receiving unit and information about the image forming apparatus, which is a destination of transmitting the print job, the screen transmission unit transmits, to the information terminal, a detailed print setting screen that includes the common setting item.

10. A method for controlling a print relay server for transmitting a print job transmitted from a print service system to an image forming apparatus, the print service system being connected to the print relay server and configured to provide a service print setting screen to an information terminal operated by a user, to receive a print setting set by the user via the provided print setting screen, and to generate the print job based on the received print setting and stored settings for the image forming apparatus connected to the print relay server and configured to output image data based on the print job, the method comprising:
- transmitting, to the information terminal, a detailed print setting screen, wherein the detailed print setting screen includes a detailed print setting that can be set through the detailed print setting screen provided to the information terminal by the print relay server but cannot be set through the service print setting screen provided to the information terminal by the print service system directly;
- receiving a print job from the print service system, which is transmitted in a case that a print instruction is input by the information terminal to the print service system;
- receiving the detailed print setting set by the user via the transmitted detailed print setting screen and converting the print job received from the print service system into a new print job based on the receive detailed print setting; and
- transmitting the new print job which has been converted to the image forming apparatus.

11. A non-transitory storage medium storing a program to cause a computer to execute a method for controlling a print relay server for transmitting a print job transmitted from a print service system to an image forming apparatus, the print service system being connected to the print relay server and configured to provide a service print setting screen to an information terminal operated by a user, to receive a print setting set by the user via the provided print setting screen, and to generate the print job based on the received print setting and stored settings for the image forming apparatus connected to the print relay server and configured to output image data based on the print job, the method comprising:
- transmitting, to the information terminal, a detailed print setting screen, wherein the detailed print setting screen includes a detailed print setting that can be set through the detailed print setting screen provided to the information terminal by the print relay server but cannot be set through the service print setting screen provided to the information terminal by the print service system directly;
- receiving a print job from the print service system, which is transmitted in a case that a print instruction is input by the information terminal to the print service system;
- receiving the detailed print setting set by the user via the transmitted detailed print setting screen and converting the print job received from the print service system into a new print job based on the receive detailed print setting; and
- transmitting the new print job which has been converted to the image forming apparatus.

* * * * *